United States Patent
Ono et al.

(10) Patent No.: US 6,403,194 B1
(45) Date of Patent: Jun. 11, 2002

(54) MAGNETIC RECORDING MEDIUM, PROCESS FOR PRODUCING SAME AND MAGNETIC DISC APPARATUS

(75) Inventors: Toshinori Ono, Odawara; Yuuichi Kokaku, Yokohama; Yoshinori Honda, Hiratsuka; Hiroyuki Suzuki, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/382,703

(22) Filed: Aug. 23, 1999

(30) Foreign Application Priority Data

Sep. 3, 1998 (JP) .......................... 10-249950
Mar. 8, 1999 (JP) .......................... 11-060373

(51) Int. Cl.⁷ .................................. G11B 5/72
(52) U.S. Cl. ............... 428/65.5; 428/216; 428/336; 428/408; 428/694 TC; 428/900
(58) Field of Search ............... 428/65.5, 216, 428/336, 408, 694 TC, 900

(56) References Cited

U.S. PATENT DOCUMENTS 5,520,981 A * 5/1996 Yang et al. ................ 428/65.5

FOREIGN PATENT DOCUMENTS

| EP | 0 547 820 | * | 6/1993 |
| JP | 6023406 B2 | | 6/1985 |
| JP | 62246129 A | | 10/1987 |
| JP | 63205813 A | | 8/1988 |
| JP | 1166384 A | | 6/1989 |
| JP | 3272017 A | | 12/1991 |
| JP | 432021 A | | 2/1992 |
| JP | 490125 A | | 3/1992 |
| JP | 528465 A | | 2/1993 |
| JP | 5174369 A | | 7/1993 |
| JP | 5225556 A | | 9/1993 |
| JP | 684168 A | | 3/1994 |
| JP | 6333231 A | | 12/1994 |
| JP | 7320256 A | | 12/1995 |
| JP | 836744 A | | 2/1996 |
| JP | 9128732 A | | 5/1997 |
| JP | 10130093 A | | 5/1998 |
| JP | 10143836 A | | 5/1998 |

* cited by examiner

Primary Examiner—Stevan A. Resan
(74) Attorney, Agent, or Firm—Kenyon & Kenyon

(57) ABSTRACT

An object of the present invention is to provide a magnetic recording medium which has a sufficient impact resistance to withstand its accidental collision with a magnetic head and is neither worn away nor fractured in the CSS area by contact or friction between the magnetic recording medium and the magnetic head even if the thickness of a protective filmy layer is reduced in the data area. In order to achieve this object, a magnetic film and a protective film are formed on a substrate, and for example, the other portion of said protective film than a portion where said protective film comes into contact with a magnetic head is made of not only carbon and nitrogen but also hydrogen for increasing the hardness of said protective film.

2 Claims, 8 Drawing Sheets

MAGNETIC RECORDING MEDIUM, PROCESS FOR PRODUCING SAME AND MAGNETIC DISC APPARATUS

BACKGROUND OF THE INVENTION

This invention relates to a magnetic recording medium which has an excellent reliability and permits magnetic recording at a high density, a process for producing said magnetic recording medium, and a magnetic disc apparatus used as an auxiliary storage for computer.

Magnetic disc apparatus used in storages such as large computers, workstations, personal computers, etc. are growing in importance year by year and have been increased in capacity and reduced in size. For the capacity increase and size reduction of the magnetic disc apparatus, increasing their density is indispensable. An example of technique for realizing the density increase is the reduction of the distance between the magnetic recording layer of a magnetic recording medium and a magnetic head.

Magnetic recording media produced by sputtering have comprised a protective film for protecting a magnetic film against sliding on a magnetic head. The reduction of thickness of the protective film and the reduction of the distance between the protective film surface and the magnetic head are the most effective means for reducing the distance between the magnetic recording layer and the magnetic head. As the protective film, carbon films formed by DC sputtering, RF sputtering (JP-A-5-174369) or CVD (JP-A-4-90125) are most generally used. For obtaining a protective film having a higher strength, a method of incorporating nitrogen atoms, hydrogen atoms, etc. into the film (JP-A-62-246129 and JP-A-5-22556) has been generally adopted.

As a conventional interface method for a magnetic recording medium and a magnetic head, there is contact-start-and-stop (CSS) method in which at the time of non-working, the magnetic head is stationary in contact with the magnetic recording medium at a predetermined position on the medium where very small concavities and convexities have been formed for preventing adhesion between the magnetic recording medium and the magnetic head, and at the time of working, i.e., the time of record writing, record reading or waiting, the magnetic head is lifted while keeping a very narrow space between the magnetic head and the magnetic recording medium.

In the case of magnetic disc apparatus to which this method is applied, the problem of wear and fracture of the protective film of a magnetic recording medium caused by contact or friction between the magnetic recording medium and a magnetic head at the beginning or end of working becomes more serious with a reduction in the thickness of the protective film. Also at the time of working, the problem of wear and fracture of the protective film caused by accidental contact between the magnetic recording medium and the magnetic head becomes more serious with a reduction in the distance between the protective film surface of the magnetic recording medium and the magnetic head.

It has been proposed that the durability of the protective film is improved by making the thickness of the protective film in an area where CSS is carried out (hereinafter referred to as CSS area), larger than that in an area where data are written (hereinafter referred to as data area) (JP-B-60-23406). However, no sufficient effect can be obtained by merely changing the film thickness because at present, the increase of the capacity and the reduction of the size are absolutely necessary. In detail, the above-mentioned data area has to be as wide as possible in order to record data as much as possible in the limited area of a disc. Therefore, the CSS area and the data area are unavoidably adjacent to each other. In such a condition, it is industrially difficult to make the film thickness in the CSS area widely different from that in the data area. Even if such a thickness change is realized, the reference position of the disc surface is abruptly changed when a head is allowed to seek between the CSS area and the data area. Thus, the thickness change causes an attitude change.

Therefore, the possible thickness difference is at most about 5 nm, and merely changing the thickness of a single film has been hardly effective. In addition, a thinned portion of about 10 nm thick of the protective film in the data area has to have a certain degree of hardness because it is easily fractured by its accidental collision with a magnetic head. However, when the protective film has such a hardness, it is too hard in the CSS area and hence has a high contact resistance with the head, resulting in a deteriorated durability.

From such a point of view, it seems effective to make physical properties of the protective film in the CSS area different from those in the data area. It has been proposed to form a protective film composed mainly of diamond in the CSS area and composed mainly of a mixture of graphite and diamond in the data area (JP-A-3-272017). However, when such a protective film is thinned to about 10 nm, it is not sufficient in strength in the CSS area and hence is easily fractured by contact or friction between a magnetic recording medium and a magnetic head at the beginning or end of working.

Further, it has been proposed to form a graphite structure in the CSS area and an amorphous structure in the data area (JP-A-4-32021). However, it is clear that a thin film with a graphite structure having a thickness of about 10 nm cannot withstand CSS. Even by combining the technique of JP-B-60-23406 with the techniques of JP-A-3-272017 and JP-A-4-32021, there could not be obtained a magnetic recording medium which had a sufficient strength to withstand its accidental collision with a magnetic head and was free from wear and fracture of its protective film in the CSS area by contact or friction between the magnetic recording medium and the magnetic head at the beginning or end of working even if the thickness of the protective film in the data area was adjusted to about 10 nm or less.

In addition, when a protective film composed of a portion having properties suitable for the CSS area and a portion having properties suitable for the data area is formed by a sputtering method, or when the thickness of a protective film is increased only in the CSS area by a sputtering method, even the formation of the protective film in the data area by the use of, for example, a masking shield out of contact with a magnetic recording medium can limit, only to a certain extent, sputtering particles which pass around behind the masking shield and intrude the data area, because of properties of sputtering. Thus, it has been difficult to make film properties in the CSS area strikingly different from those in the data area or change the film thickness markedly in a short distance.

Ion beam deposition is known as a means for forming a protective filmy layer which is tough even at a film thickness smaller than that of a protective filmy layer composed mainly of carbon by sputtering. However, it is industrially difficult to form a protective filmy layer only by ion beam deposition because the life of a hot filament used in an ion gun is short.

SUMMARY OF THE INVENTION

The present invention was made in view of such problems. A first object of the present invention is to provide a magnetic recording medium which has a sufficient impact resistance to withstand its accidental collision with a magnetic head and is free from wear and fracture of its protective film in the CSS area by contact or friction between the magnetic recording medium and the magnetic head at the beginning or end of working even if the thickness of the protective film in the data area is reduced to about 10 nm or less.

A second object of the present invention is to provide a process for producing a magnetic recording medium capable of achieving the first object. A third object of the present invention is to provide a magnetic storage suitable for attaining both a high packing density and a high reliability by using a magnetic recording medium obtained by achieving the above first object.

A fourth object of the present invention is to provide a process for producing a magnetic recording medium comprising a substrate, a magnetic film formed thereon and a protective film formed thereon for the protection of said magnetic film and composed mainly of carbon, said magnetic recording medium having sufficient impact resistance and lifting stability in the data area and a sufficient reliability on resistance to sliding in the CSS area, which process uses both an ion beam deposition method and a sputtering method.

A fifth object of the present invention is to provide a magnetic recording medium obtained as a result of achieving the fourth object. A sixth object of the present invention is to provide a magnetic storage suitable for attaining both a high packing density and a high reliability by using a magnetic recording medium obtained by achieving the above fifth object.

For solving the problems described above, the present invention employs the following constitutions:

A magnetic recording medium comprising a substrate, a magnetic film formed thereon and a protective film formed thereon for the protection of said magnetic film and composed mainly of carbon, wherein a portion of said protective film where said protective film comes into contact with a magnetic head at the time of starting and/or standing of said magnetic head is composed mainly of carbon and nitrogen, and the portion other than said contact portion of said protective film is composed mainly of not only carbon and nitrogen but also hydrogen for increasing the hardness of the protective film;

A magnetic recording medium comprising a substrate, a magnetic film formed thereon and a protective film formed thereon for the protection of said magnetic film and composed mainly of carbon, wherein the hardness of a portion of said protective film where said protective film comes into contact with a magnetic head at the time of starting and/or standing of said magnetic head is less than 19 Gpa and not less than 15 Gpa, and the hardness of the portion other than said contact portion of said protective film is 19 Gpa or more;

A magnetic recording medium comprising a substrate, a magnetic film formed thereon and a protective film formed thereon for the protection of said magnetic film and composed mainly of carbon, wherein a portion of said protective film where said protective film comes into contact with a magnetic head at the time of starting and/or standing of said magnetic head is composed mainly of carbon and nitrogen and has a hardness of less than 19 Gpa and not less than 15 Gpa, and the portion other than said contact portion of said protective film is composed mainly of carbon, nitrogen and hydrogen and has a hardness of 19 Gpa or more;

The above-mentioned magnetic recording medium wherein the thickness of the portion other than said contact portion of said protective film is 15 nm or less;

A process for producing a magnetic recording medium comprising a substrate, a magnetic film formed thereon and a protective film formed thereon for the protection of said magnetic film and composed mainly of carbon, which comprises forming a protective filmy layer capable of constituting substantially the whole surface of said magnetic recording medium, by a sputtering method using $H_2$ in addition to either only $N_2$ or a combination of $N_2$ and at least one of Ne, Ar, Kr and Xe, and then forming another protective filmy layer thereon as a portion of said protective film where the protective film comes into contact with a magnetic head at the time of starting and/or standing of said magnetic head, by a sputtering method using either only $N_2$ or a combination of $N_2$ and at least one of Ne, Ar, Kr and X, after taking a means for preventing the adhesion of sputtering particles in the portion other than said contact portion;

A process for producing a magnetic recording medium comprising a substrate, a magnetic film formed thereon and a protective film formed thereon for the protection of said magnetic film and composed mainly of carbon, which comprises forming a filmy layer as a portion of said protective film where said protective film comes into contact with a magnetic head at the time of starting or standing of said magnetic head, by an ion beam method using either only a hydrocarbon gas or a combination of a hydrocarbon gas and at least one of Ne, Ar, Kr and Xe, and then forming another protective filmy layer capable of constituting substantially the whole surface of said magnetic recording medium, by a physical vapor deposition method or a chemical vapor deposition method;

A process for producing a magnetic recording medium comprising a substrate, a magnetic film formed thereon and a protective film formed thereon for the protection of said magnetic film and composed mainly of carbon, which comprises forming a protective filmy layer capable of constituting substantially the whole surface of said magnetic recording medium, by a physical vapor deposition method or a chemical vapor deposition method, and then forming another filmy layer thereon as a portion of said protective film where said protective film comes into contact with a magnetic head at the time of starting or standing of said magnetic head, by an ion beam method using either only a hydrocarbon gas or a combination of a hydrocarbon gas and at least one of Ne, Ar, Kr and Xe; and A magnetic recording medium comprising a substrate, a magnetic film formed thereon and a protective film formed thereon for the protection of said magnetic film and composed mainly of carbon, wherein a portion of said protective film where said protective film comes into contact with a magnetic head at the time of starting or standing of said magnetic head comprises a diamond-like (DLC) layer composed mainly of carbon and hydrogen and an amorphous carbon layer composed mainly of carbon, a combination of carbon and nitrogen, or a combination of carbon, nitrogen and hydrogen, and the portion other than said contact portion of said protective film comprises an amorphous carbon layer composed mainly of carbon, a combination of carbon and nitrogen, or a combination of carbon, nitrogen and hydrogen.

Figure 1:
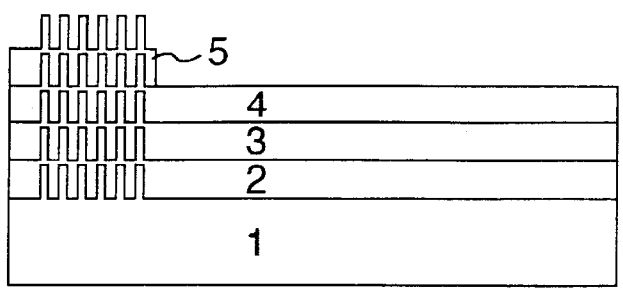
FIG. 1 is a schematic cross-sectional view of a magnetic recording medium according to one embodiment of the present invention.

In the drawings, the reference numerals denote the following:
1: nonmagnetic substrate,
2: Cr alloy primer layer,
3: Co alloy magnetic layer,
4: protective filmy layer,
5: protective filmy layer,
21: protective-film forming chamber,
22: protective-film forming chamber,
23: shield against sputtering particles,
24: shield against sputtering particles,
61: magnetic disc medium,
62: driving unit for driving a magnetic recording medium,
63: magnetic head comprising a recording portion and a reproducing portion,
64: means for moving the magnetic head in relation to the aforesaid magnetic recording medium,
65: means for inputting signals into the magnetic head, and a record reproduction signal processing means for reproducing outputted signals,
601: base,
602: coil,
603: upper recording magnetic pole,
604: lower recording magnetic pole and upper shielding layer,
605: magnetoresistance sensor,
606: electrode pattern on each side of the magnetoresistance sensor,
607: lower shield layer,
608: gap layer,
700: gap layer of aluminum oxide,
701: signal detection region of a magnetism sensor,
702: lateral-bias layer,
703: separating layer for preventing the diversion of a sense electric current,
704: magnetoresistance ferromagnetic layer,
705: tapered portion formed by tapering,
706: permanent-magnet layer,
801: Ta buffer layer,
802: first magnetic layer,
803: nonmagnetic intermediate layer made of copper,
804: second magnetic layer,
805: antiferromagnetic alloy layer,
1': nonmagnetic substrate,
2': Cr alloy primer layer,
3': Co alloy magnetic layer,
4': protective filmy layer,
5': protective filmy layer,
21': protective-film forming chamber,
22': hot filament,
23': anode,
24': grid,
25': shield against deposited particles,
31': protective-film forming chamber.

DETAILED DESCRIPTION OF THE INVENTION

First, the outlines of the constitution, function and action of the present invention are explained below. In a magnetic disc comprising a substrate, a magnetic film formed thereon and a protective film formed thereon for the protection of said magnetic film and composed mainly of carbon, a portion of said protective film where a magnetic head comes into contact with said protective film at the time of starting and/or standing of the magnetic head is composed mainly of carbon and nitrogen, and the other portion of said protective film is composed mainly of not only carbon and nitrogen but also hydrogen as an adjusting means for changing film properties (hardness and Young's modulus).

When the hardness of the portion of said protective film where a magnetic head comes into contact with said protective film at the time of starting and/or standing of the magnetic head is measured in a definite-indentation-depth mode by using a Barkovich type diamond indenter having a radius of curvature of 0.1 $\mu$m, it is preferably less than 19 Gpa and not less than 15 Gpa at an indentation depth of 10 nm. The hardness of the other portion of said protective film than the portion where a magnetic head comes into contact with said protective film at the time of starting and/or standing of the magnetic head is preferably 19 Gpa or more. The thickness of the other portion of said protective film than the portion where a magnetic head comes into contact with said protective film at the time of starting and/or standing of the magnetic head is preferably 10 nm or less.

The reason why the hardness of the portion of said protective film where a magnetic head comes into contact with said protective film at the time of starting and/or standing of the magnetic head is preferably less than 19 Gpa and not less than 15 Gpa is that the protective film is liable to be worn away when the hardness is less than 15 Gpa, and that the protective film is liable to be fractured by shear stress due to sliding on the head when the hardness is more than 19 Gpa. The reason why the hardness of the other portion of said protective film than the portion where a magnetic head comes into contact with said protective film at the time of starting and/or standing of the magnetic head is preferably 19 Gpa or more is that at a hardness of less than 19 Gpa, said protective film tends to be injured, resulting in crash, if the magnetic head at work collides with the protective film accidentally or any substance is present between the magnetic head and said protective film.

The reason why the thickness of the other portion of said protective film than the portion where a magnetic head comes into contact with said protective film at the time of starting and/or standing of the magnetic head is preferably 10 nm or less is that the distance between the magnetic head and the magnetic recording layer is too long when the thickness is more than 10 nm.

The above-mentioned protective film can be obtained by forming a film composed mainly of carbon, hydrogen and nitrogen and laminating another film composed mainly of carbon and nitrogen on the film composed mainly of carbon, hydrogen and nitrogen, as the portion of the protective film where a magnetic head comes into contact with the protective film at the time of starting and/or standing of the magnetic head. Such a protective film can be formed by forming a film by a sputtering method using a carbon graphite target and using $H_2$ in addition to either only $N_2$ or a combination of $N_2$ and at least one of inactive gases Ne, Ar, Kr and Xe, and then forming another film thereon by a sputtering method using a carbon graphite target and using either only $N_2$ or a combination of $N_2$ and at least one of Ne, Ar, Kr and Xe, after taking a means (a combination of a mask and an anode) for preventing the adhesion of sputtering particles in the portion other than a portion where a magnetic head comes into contact with the protective film at the time of starting and/or standing of the magnetic head.

The magnetic storage of the present invention can be obtained as a magnetic storage comprising a magnetic recording medium, a driving unit for driving said magnetic recording medium, a magnetic head comprising a recording portion and a reproducing portion, a means for moving said magnetic head in relation to said magnetic recording medium, a means for inputting signals into said magnetic head, and a record reproduction signal processing means for reproducing signals outputted from said magnetic head, wherein the reproducing portion of the magnetic head is composed of a magnetoresistance effect type magnetic head, and the magnetic recording medium is composed of a magnetic recording medium comprising a protective film having film properties, hardness and thickness which have the characteristics described above.

Further, the magnetoresistance sensor portion of said magnetoresistance effect type magnetic head is formed between two shield layers made of a soft magnetic material which are at a distance of 0.2 μm or less from each other. In addition, the product of the thickness t of magnetic layer of the magnetic recording medium having the structure described above and the residual magnetic flux density Br measured by applying a magnetic field in a direction of traveling of said magnetic head in relation to said magnetic recording medium during recording, i.e., Br×t is adjusted to not more than 9.6 mA (120 gauss·micron) and not less than 3.2 mA (40 gauss·micron).

The reason why the magnetoresistance sensor portion of said magnetoresistance effect type magnetic head has to be formed between two shield layers made of a soft magnetic material which are at a distance of 0.2 μm or less from each other is that otherwise no sufficient reproduction output can be attained in a magnetic storage having a maximum line packing density of more than 220 kFCI. The distance between the two shield layers made of a soft magnetic material is preferably 0.12 μm or more from the viewpoint of ease of construction.

The reason why the product of the thickness t of magnetic layer of the magnetic recording medium having the structure described above and the residual magnetic flux density Br measured by applying a magnetic field in a direction of traveling of said magnetic head in relation to said magnetic recording medium during recording, i.e., Br×t is not more than 9.6 mA (120 gauss·micron) and not less than 3.2 mA (40 gauss·micron) is as follows: when Br×t is less than 3.2 mA (40 gauss·micron), inaccurate information is very likely to be reproduced owing to a decrease of the reproduction output caused by long-term standing after recording; and when Br×t is more than 9.6 mA (120 gauss·micron), overwriting at the time of recording becomes difficult.

In addition, it is also possible to control the crystalline orientation of the magnetic layer by forming a primer layer composed of at least two layers in said magnetic recording medium. By forming this multi-layer primer layer, the influence of diffusion of atoms from the primer layer to the magnetic layer can be greatly reduced, and at the same time, the crystallinity of the primer layer adjacent to the magnetic layer can be improved, so that the adhesion between the magnetic layer and the primer layer is increased, resulting in a high resistance to sliding. Furthermore, since the surface of the primer layer adjacent to the magnetic layer has no long-range periodic atom alignment, grains of the magnetic layer formed on the primer layer can be refined and the crystalline orientation of the magnetic layer becomes controllable. Accordingly, the average grain size of crystals constituting the magnetic layer can be controlled to a very small size of 15 nm or less suitable for noise reduction, and at the same time, the direction of the axis of easy magnetization can be controlled to a direction parallel to the film surface which is suitable for in-plane magnetic recording.

The magnetoresistance effect type magnetic head used in the magnetic storage of the present invention comprises a magnetoresistance sensor comprising a plurality of electroconductive magnetic layers capable of causing a great resistance change owing to relative changes of their mutual directions of magnetization which are caused by an external magnetic field, and electroconductive nonmagnetic layers located among said electroconductive magnetic layers. Such a reproducing head is used in order to reproduce stably signals recorded at a maximum line packing density of more than 300 kFCI, to obtain a signal output.

Further, the present invention is accomplished by forming the magnetoresistance effect type magnetic head on a magnetic head slider having an area of a lifting surface rail of 1.25 mm² or less and a mass of 2 mg or less. The reason why the area of the lifting surface rail is 1.25 mm² or less is that the probability of collision with the above-mentioned projections is reduced and that at the same time the reliability on impact resistance can be improved by adjusting the mass to 2 mg or less. Thus, it becomes possible to attain both a packing density of 5 gigabits or more per square inch and a high reliability on impact resistance.

In a magnetic recording medium comprising a substrate, a magnetic film formed thereon and a protective film formed thereon for the protection of said magnetic film and composed mainly of carbon, the following is also possible: a portion of said protective film where said protective film comes into contact with a magnetic head at the time of starting and/or standing of said magnetic head is formed of a diamond-like (DLC) layer composed mainly of carbon and hydrogen and an amorphous carbon layer composed mainly of carbon and nitrogen and containing hydrogen, and the portion other than said contact portion of said protective film is formed of an amorphous carbon layer composed mainly of carbon and nitrogen and containing hydrogen.

The reason why the contact portion of said protective film is formed of a diamond-like (DLC) layer composed mainly of carbon and hydrogen and an amorphous carbon layer composed mainly of carbon and nitrogen and containing hydrogen is that imparting thereto a sufficient strength to prevent fracture by sliding on the magnetic head during CSS is aimed at. The reason why the portion other than said contact portion of said protective film is formed of an amorphous carbon layer composed mainly of carbon and nitrogen and containing hydrogen is that imparting thereto a sufficient strength to withstand collision with the magnetic head is aimed at.

In addition, the thickness of the other portion of said protective film than the portion where said protective film comes into contact with a magnetic head at the time of starting and/or standing of said magnetic head is preferably 10 nm or less. The thickness of the portion of said protective film where said protective film comes into contact with a magnetic head at the time of starting and/or standing of said magnetic head is preferably larger than that of the portion other than said contact portion of said protective film and is preferably 20 nm or less. The rate of thickness change in the radial direction of said protective film in the boundary between said contact portion of said protective film and the portion other than said contact portion of said protective film is preferably higher than the rate of thickness change in the radial direction in the portion other than said contact portion of said protective film and has a value of preferably 1.0 nm/mm or more.

The reason why the thickness of the other portion of said protective film than the portion where said protective film comes into contact with a magnetic head at the time of starting and/or standing of said magnetic head is preferably 10 nm or less is that when the thickness is more than 10 nm, the distance between the magnetic head and the magnetic recording layer is large and hence not suitable for a high packing density. The reason why the thickness of the portion of said protective film where said protective film comes into contact with a magnetic head at the time of starting and/or standing of said magnetic head is preferably larger than that of the portion other than said contact portion of said protective film and is preferably 20 nm or less is that when the thickness is more than 20 nm, a sufficient strength is imparted but the attitude of said magnetic head is not stable at the time of its starting, resulting in an increased possibility of the contact of the magnetic head with said magnetic recording medium.

The reason why the rate of thickness change in the radial direction of said protective film in the boundary between said contact portion of said protective film and the portion other than said contact portion of said protective film is preferably higher than the rate of thickness change in the radial direction in the portion other than said contact portion of said protective film and has a value of preferably 1.0 nm/mm or more is that the following purpose is achieved: the thickness of the portion of said protective film where said protective film comes into contact with a magnetic head at the time of starting and/or standing of said magnetic head is increased in a short distance as abruptly as possible, whereby the uniformity of film thickness in the data area is assured and the thickness of the portion of said protective film where said protective film comes into contact with a magnetic head at the time of starting and/or standing of said magnetic head is assured as desired.

Such a protective film as is described above can be produced either by forming a filmy layer as a portion of said protective film where said protective film comes into contact with a magnetic head at the time of starting and/or standing of said magnetic head, by an ion beam method using either only a hydrocarbon gas or a combination of a hydrocarbon gas and at least one of Ne, Ar, Kr and Xe, and then forming another protective filmy layer capable of constituting substantially the whole surface of the above-mentioned magnetic recording medium, by a sputtering method using $N_2$ and at least one of $H_2$, Ne, Ar, Kr and Xe; or by forming a protective filmy layer capable of constituting substantially the whole surface of the above-mentioned magnetic recording medium, by a sputtering method using $N_2$ and at least one element of $H_2$, Ne, Ar, Kr and Xe, and then forming another filmy layer thereon as a portion of said protective film where said protective film comes into contact with a magnetic head at the time of starting and/or standing of said magnetic head, by an ion beam method using either only a hydrocarbon gas or a combination of a hydrocarbon gas and at least one element of Ne, Ar, Kr and Xe. In forming a filmy layer as said contact portion by the ion beam method, it is effective to take a means for preventing the formation of a filmy layer as the portion other than said contact portion by placing a shield in the vicinity of the above-mentioned magnetic recording medium.

DESCRIPTION OF THE PREFERRED EMBODIMENTS

Embodiments of the present invention are explained below in detail. FIG. 1 shows one example of embodiment of the present invention.

Embodiment 1

A substrate 1 obtained by plating an aluminum alloy base material (outside diameter 95 mm, inside diameter 25 mm, thickness 0.8 mm) with Ni—P was textured so that Ra=2 nm and Rp=15 nm (Ra and Rp are indications of roughness). Then, projections having a height of 15 nm and a diameter of 3.5 μm were formed thereon at intervals of 10 μm by laser irradiation in the area corresponding to a disc radius R range of 18 to 20.7 mm and the thus treated substrate 1 was thoroughly washed. The substrate 1 was introduced into a vacuum tank evacuated to about 5.3×10 E−5 Pa (4.0×10 E−7 Torr). First, the substrate 1 was conveyed to a heating chamber in the vacuum tank and heated to 260° C. with an IR heater (infrared heater).

Subsequently, the substrate 1 was conveyed to a primer-layer forming chamber and a Cr—10 at. % Mo—7.5 at. % Ti alloy primer layer 2 was formed thereon in a thickness of 30 nm by a DC magnetron sputtering method under an Ar atmosphere at about 0.8 Pa (6 mTorr). Then, the substrate 1 was conveyed to a magnetic-recording-layer forming chamber and a Co—20 at. % Cr—4 at. % Ta—8 at. % Pt alloy layer 3 (capable of forming a magnetic layer) was formed thereon in a thickness of 22 nm by a DC magnetron sputtering method under an Ar atmosphere at about 0.9 Pa (7 mTorr). Using this substrate having the Cr—10 at. % Mo—7.5 at. % Ti alloy primer layer 2 and Co—20 at. % Cr—4 at. % Ta—8 at. % Pt alloy layer 3 formed thereon, the following protective filmy layers composed mainly of carbon according to the present invention were formed.

As the above-mentioned substrate 1, there can be used, for example, rigid substrates made of ceramics of chemically strengthened aluminosilicate, soda-lime glass, silicon, borosilicate glass, etc. or made of glass-glazed ceramics, as well as Al—Mg alloy substrates subjected to nonelectrode plating with Ni—P.

The primer layer 2 is used as a primer film for controlling the crystalline orientation of the magnetic layer formed thereon. As the primer layer, there can also be used thin films of Cr-based alloys such as nonmagnetic Cr—V, Cr—Ti, Cr—Mo, Cr—Si and Cr—Mo—Ti alloys which form disordered solid solutions capable of being subjected to (100) orientation good in crystal matching with the magnetic film. When the primer layer was formed by adding 0.5 vol % to 50 vol % of nitrogen to a gas for discharge used in the sputtering, the refinement of grains of the primer layer took place. Consequently, grains of the magnetic layer subsequently formed were also refined, so that medium noise could be reduced.

As the magnetic layer 3, there can be used not only Co—Cr—Pt—Ta alloys but also multi-component alloy systems which are composed mainly of Co, contain Pt for increasing the coercive force and contain Cr, Ta, $SiO_2$, Nb, etc. for reducing medium noise. Particularly when Ta, Nb, V or Ti was added, the melting point of a target was lowered, so that the progress of component separation of the magnetic film containing Cr was desirably facilitated.

Co-based alloy systems containing Pt, Ni or Mn are practical because their anisotropy energy does not decrease so much as that of Co-based alloy systems containing any other additive element. Specifically, there can be used alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$, etc., as well as Co—Cr—Pt.

As to the composition of the Co alloy layer constituting the ferromagnetic portion, the amount of Cr incorporated as a solid solution is considered to be 5 to 10 at. % and the amount of Ta incorporated as a solid solution about 2 at. %. When the Co alloy magnetic layer is formed by incorporating Cr and Ta in amounts larger than the above amounts, magnetic separation in the magnetic layer proceeds, resulting in reduced medium noise. As a practical composition, there can be used, for example, Co—20 at. % Cr—4 at. % Ta—8 at. % Pt alloy,
Co—22 at. % Cr—20 at. % Pt alloy,
Co—15 at. % Cr—8 at. % Pt—20 mol. % $SiO_2$ alloy,
Co—17 at. % Cr—12 at. % Pt—5 at. % Mn alloy,
Co—17 at. % Cr—5 at. % Nb—10 at. % Pt alloy,
Co—20 at. % Cr—5 at. % V—12 at. % Pt alloy,
Co—20 at. % Cr—10 at. % V—15 at. % Pt alloy, and
Co—15 at. % Cr—5 at. % Nb—5 at. % Ta—20 at. % Pt alloy.

Figure 2:
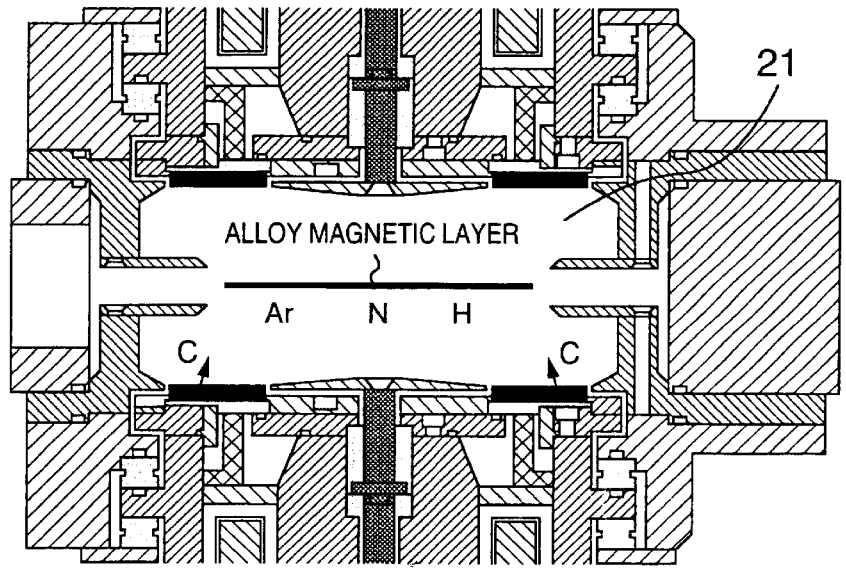
FIG. 2 is a schematic illustration of a protective-film forming chamber 21.

The above-mentioned substrate was conveyed to the protective-filmy-layer forming chamber 21 shown in FIG. 2 without taking out the substrate from the vacuum tank. Ar gas containing 30% $N_2$ and 7.5% $H_2$ was introduced into the chamber 21 at a rate of 24 sccm (Standard cubic centimeter per minute) through a mass flow controller while evacuating the protective-filmy-layer forming chamber 21 with a turbo molecular pump. In this case, the pressure was about 1 Pa (8 mTorr) as measured with a Baratron gauge. Then, DC 1000 W was applied to graphite sintering targets fixed on cathodes located on both sides of the substrate, to induce plasma. In this case, the discharge current was about 1.5 A and the discharge voltage about 670 V.

By this so-called reactive sputtering method, a protective filmy layer 4 composed mainly of carbon and containing large amounts of nitrogen and hydrogen was formed in a thickness of 8 nm on the Co—Cr—Ta—Pt alloy layer 3. In this case, the build-up rate of the film was 0.8 nm/s.

Figure 3:
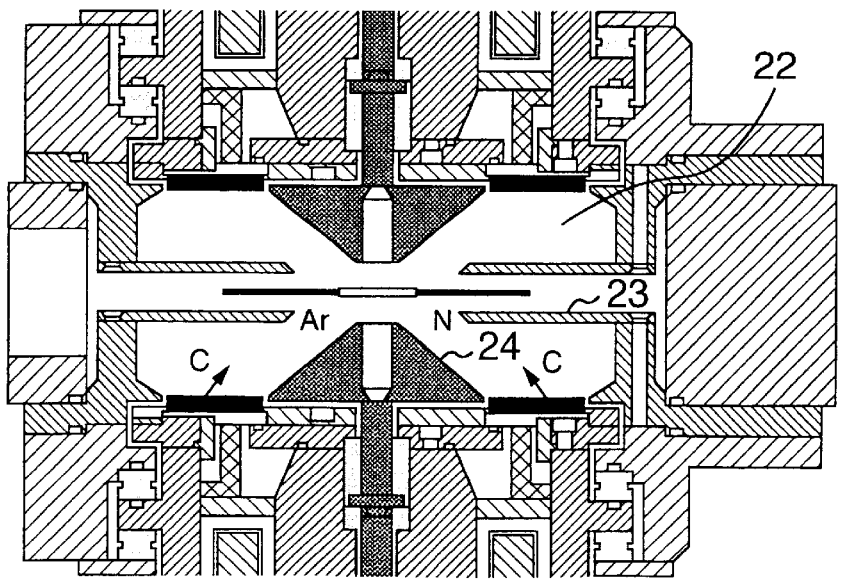
FIG. 3 is a schematic illustration of a protective-film forming chamber 22.

Next, the thus treated substrate was conveyed to a protective-filmy-layer forming chamber 22. The protective-filmy-layer forming chamber 22 is equipped with the shields against sputtering particles 23 and 24 shown in FIG. 3, so as to have such a structure that a film is actively built up only in the whole area within a disc radius of 20.7 mm on the substrate where a magnetic head comes into contact with a protective film to be formed, at the time of starting and/or standing of the magnetic head and that build-up of a film is very difficult outside a disc radius of 20.7 mm. Ar gas containing 30% $N_2$ was introduced into the chamber 22 at a rate of 15 sccm through a mass flow controller while evacuating the protective-filmy-layer forming chamber 22 with a turbo molecular pump. In this case, the pressure was about 0.9 Pa (6.5 mTorr) as measured with a Baratron gauge.

Then, DC 1000 W was applied to graphite sintering targets fixed on cathodes located on both sides of the substrate, to induce plasma. In this case, the discharge current was about 1.4 A and the discharge voltage about 710 V. By this so-called reactive sputtering method, a protective filmy layer 5 composed mainly of carbon and containing a large amount of nitrogen was formed in a thickness of 5 nm within a disc radius of 20.7 mm on the protective filmy layer 4. In this case, the build-up rate of the film was 0.5 nm/s. The thus treated substrate was taken out of the vacuum tank and allowed to cool to room temperature spontaneously.

A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The protective film of the disc produced in the manner described above was analyzed at an angle of detection of 30° by X-ray photoelectron spectroscopy (ESCA). As a result, the following was found: at a radial position of 19 mm and in a depth range of 0 nm to about 3 nm from the surface, the proportion of carbon atoms was 75 at. %, the proportion of nitrogen atoms was 15 at. % and the balance was of other atoms including mainly oxygen. The following was also found: at a radial position of 30 mm and in a depth range of 0 nm to about 3 nm from the surface, the proportion of carbon atoms was 77 at. %, the proportion of nitrogen atoms was 17 at. % and the balance was of other atoms including mainly oxygen. Thus, the amount of nitrogen in the protective filmy layer 4 and that in the protective filmy layer 5 were not widely different.

The protective film was subjected to hydrogen forward scattering spectroscopy (HFS) under the following conditions: He++ion beam energy=160 fJ (1 MeV); angle of detection 30°. It was also subjected to Rutherford backscattering spectroscopy (RBS) at an angle of detection of 160°. As a result, it was found that the percentage of the number of hydrogen atoms based on the total number of carbon atoms and hydrogen atoms was 8% at a radial position of 19 mm and 23% at a radial position of 30 mm, namely, the protective filmy layer 4 contained a large number of hydrogen atoms, while the protective filmy layer 5 did not contain a large number of hydrogen atoms.

Then, the hardness and Young's modulus of the protective film were estimated at radial positions of 19 mm (CSS area) and 30 mm (data area). The hardness and Young's modulus referred to here are those measured with a thin-film microhardness measuring apparatus (a nanoindenter) manufactured by Nano Instrument Co., in a definite-indentation-depth mode by using a Barkovich type diamond indenter having a radius of curvature of 0.1 μm. As a result, it was found that at a radial position of 19 mm and a depth of 5 nm, the hardness was 17 GPa and the Young's modulus 216 GPa, and that at a radial position of 30 mm and a depth of 5 nm, the hardness was 21 GPa and the Young's modulus 241 GPa. Thus, the protective filmy layer 4 had both a larger hardness value and a larger Young's modulus value than did the protective filmy layer 5.

On the other hand, ten of the discs also having the lubricant layer formed thereon were individually set in a contact-start-and-stop (CSS) evaluation apparatus and tested. When the 10 discs were subjected to CSS 50,000 times at a revolution rate of 7,500 r.p.m., all of the 10 discs finished the test without crash. When their surfaces after the test were carefully observed under a microscope and carefully and visually observed by oblique light, no injury was detected in the discs. Thus, it was proved that the magnetic recording medium of the present invention has a sufficient reliability on resistance to sliding when the thickness of the protective film in the CSS area is 13 nm.

Next, 0.1 g of alumina particles having an average particle size of 0.1 μm were casted on each of the 10 discs while carrying out random seeking of a magnetic head at 7,500 r.p.m. in the area other than the area where CSS was carried out, i.e., the so-called data area (corresponding to a disc radius range of 21 mm to 46 mm) where the protective film did not steadily come into contact with the magnetic head. After 120 seconds of the seeking, the disc surface was observed under a microscope and visually observed by oblique light. As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective filmy layer in the data area is as very small as 8 nm. The above evaluation results are described in Table 1 as those for sample No. 1.

COMPARATIVE EXAMPLE 1

Sample No. 2 was produced by substantially the same process as in Embodiment 1 except that no protective filmy layer 5 was formed. Sample No. 2 was evaluated by the same methods as in Embodiment 1. As a result of ESCA analysis, the following was found: at a radial position of 19 mm and in a depth range of 0 nm to about 3 nm from the surface, the proportion of carbon atoms was 75 at. %, the proportion of nitrogen atoms was 15 at. % and the balance was of other atoms.

The following was also found: at a radial position of 30 mm and in a depth range of 0 nm to about 3 nm from the surface, the proportion of carbon atoms was 77 at. %, the proportion of nitrogen atoms was 17 at. % and the balance was of other atoms including mainly oxygen. Thus, there was no significant difference between the results obtained at the radial position of 19 mm and the results obtained at the radial position of 30 mm. As a result of HFS and RBS analyses, it was found that the percentage of the number of hydrogen atoms based on the total number of carbon atoms and hydrogen atoms was 22% at a radial position of 19 mm and 25% at a radial position of 30 mm, namely, it was not significantly different at the two radial positions. At a radial position of 19 mm and a depth of 5 nm, the hardness was 20 GPa and the Young's modulus 240 GPa. At a radial position of 30 mm and a depth of 5 nm, the hardness was 20 GPa and the Young's modulus 243 GPa. Thus, the hardness and the Young's modulus were not significantly different at the two radial positions.

On the other hand, 10 discs also having a lubricant layer formed thereon were individually set in a (CSS) evaluation apparatus and tested in the same manner as in Embodiment 1. As a result, all of the 10 discs underwent crash owing to less than 1,000 runs of CSS. In addition, 10 other discs also having a lubricant layer formed thereon were subjected to a seek test and surface observation in the same manner as in Embodiment 1. Although the surface of the protective film of each disc received some very slight scratches, so-called crash accompanying the fracture of the protective film did not occur. Thus, it turned out that sample No. 2 produced by the process according to Comparative Example 1 has a sufficient reliability on resistance to sliding in the data area but cannot have a sufficient reliability on resistance to sliding in the CSS area.

COMPARATIVE EXAMPLE 2

When a protective filmy layer 5 was formed in the protective-filmy-layer forming chamber 22, pure Ar gas was introduced into the chamber 22 at a rate of 15 sccm through a mass flow controller. In this case, the pressure was about 0.9 Pa (6.8 mTorr) as measured with a Baratron gauge. Then, DC 1000 W was applied to graphite sintering targets fixed on cathodes located on both sides of the substrate, to induce plasma. In this case, the discharge current was about 1.6 A and the discharge voltage about 625 V. By this sputtering method, the protective filmy layer 5 composed mainly of carbon was formed in a thickness of 5 nm within a disc radius of 20.7 mm on a protective filmy layer 4. In this case, the build-up rate of the film was 0.95 nm/s. Sample No. 3 was produced by substantially the same process as in Embodiment 1 except for the above method for forming the protective filmy layer 5.

Sample No. 3 was evaluated by the same methods as in Embodiment 1. As a result of ESCA analysis, the following was found: at a radial position of 19 mm and in a depth range of 0 nm to about 3 nm from the surface, the proportion of carbon atoms was 85 at. %, the proportion of nitrogen atoms was 5 at. % and the balance was of other atoms including mainly oxygen.

The following was also found: at a radial position of 30 mm and in a depth range of 0 nm to about 3 nm from the surface, the proportion of carbon atoms was 77 at. %, the proportion of nitrogen atoms was 17 at. % and the balance was of other atoms including mainly oxygen. As a result of HFS and RBS analyses, it was found that the percentage of the number of hydrogen atoms based on the total number of carbon atoms and hydrogen atoms was 7% at a radial position of 19 mm and 22% at a radial position of 30 mm. At a radial position of 19 mm and a depth of 5 nm, the hardness was 7 GPa and the Young's modulus 110 GPa. At a radial position of 30 mm and a depth of 5 nm, the hardness was 21 GPa and the Young's modulus 237 GPa.

On the other hand, 10 discs also having a lubricant layer formed thereon were individually set in a (CSS) evaluation apparatus and tested in the same manner as in Embodiment 1. As a result, all of the 10 discs underwent crash owing to less than 5,000 runs of CSS. In addition, 10 other discs also having a lubricant layer formed thereon were subjected to a seek test and surface observation in the same manner as in Embodiment 1. Although the surface of the protective film of each disc received some very slight scratches, so-called crash accompanying the fracture of the protective film did not occur. Thus, it turned out that sample No. 3 produced by the process according to Comparative Example 2 has a sufficient reliability on resistance to sliding in the data area but cannot have a sufficient reliability on resistance to sliding in the CSS area.

COMPARATIVE EXAMPLE 3

When a protective filmy layer 4 was formed in the protective-filmy-layer forming chamber 21, Ar gas containing 30% $N_2$ was introduced into the chamber 21 at a rate of 24 sccm through a mass flow controller. In this case, the pressure was about 1.2 Pa (9.0 mTorr) as measured with a Baratron gauge. Then, DC 1000 W was applied to graphite sintering targets fixed on cathodes located on both sides of the substrate, to induce plasma. In this case, the discharge current was about 1.3 A and the discharge voltage about 770 V. By this so-called reactive sputtering method, the protective filmy layer 4 composed mainly of carbon and containing a large amount of nitrogen was formed in a thickness of 8 nm on a Co—Cr—Ta—Pt alloy layer 3.

In this case, the build-up rate of the film was 1.0 nm/s. Sample No. 4 was produced by substantially the same process as in Embodiment 1 except for the above method for forming the protective filmy layer 4. Sample No. 4 was evaluated by the same methods as in Embodiment 1. As a result of ESCA analysis, the following was found: at a radial position of 19 mm and in a depth range of 0 nm to about 3 nm from the surface, the proportion of carbon atoms was 73 at. %, the proportion of nitrogen atoms was 15 at. % and the balance was of other atoms including mainly oxygen.

The following was also found: at a radial position of 30 mm and in a depth range of 0 nm to about 3 nm from the surface, the proportion of carbon atoms was 74 at. %, the proportion of nitrogen atoms was 17 at. % and the balance was of other atoms including mainly oxygen. As a result of HFS and RBS analyses, it was found that the percentage of the number of hydrogen atoms based on the total number of carbon atoms and hydrogen atoms was 5% at radial positions of 19 mm and 30 mm. At a radial position of 19 mm and a depth of 5 nm, the hardness was 16 GPa and the Young's modulus 212 GPa. At a radial position of 30 mm and a depth of 5 nm, the hardness was 17 GPa and the Young's modulus 217 GPa.

On the other hand, 10 discs also having a lubricant layer formed thereon were individually set in a (CSS) evaluation apparatus and tested in the same manner as in Embodiment 1. As a result, all of the 10 discs finished the test without crash, and no injury was detected in the discs by subsequent surface observation. However, when the 10 discs were subjected to a seek test in the same manner as in Embodiment 1, their protective films received very slight scratches on the surfaces in about 10 seconds and were fractured in about 30 seconds, resulting in crash.

Thus, it turned out that sample No. 4 produced by the process according to Comparative Example 3 has a sufficient reliability on resistance to sliding in the CSS area but cannot have a sufficient reliability on resistance to sliding in the data area.

COMPARATIVE EXAMPLE 4

When a protective filmy layer 5 was formed in the protective-filmy-layer forming chamber 22, Ar gas containing 30% $N_2$ and 7.5% $H_2$ was introduced into the chamber 22 at a rate of 15 sccm through a mass flow controller. In this case, the pressure was about 0.8 Pa (6.2 mTorr) as measured with a Baratron gauge. Then, DC 1000 W was applied to graphite sintering targets fixed on cathodes located on both sides of the substrate, to induce plasma. In this case, the discharge current was about 1.7 A and the discharge voltage about 590 V.

By this so-called reactive sputtering method, the protective filmy layer 5 composed mainly of carbon and containing large amounts of nitrogen and hydrogen was formed in a thickness of 5 nm within a disc radius of 20.7 mm on a protective filmy layer 4. In this case, the build-up rate of the film was 0.8 nm/s.

Sample No. 5 was produced by substantially the same process as in Embodiment 1 except for the above method for forming the protective filmy layer 5. Sample No. 5 was evaluated by the same methods as in Embodiment 1. As a result of ESCA analysis, the following was found: at a radial position of 19 mm and in a depth range of 0 nm to about 3 nm from the surface, the proportion of carbon atoms was 73 at. %, the proportion of nitrogen atoms was 15 at. % and the balance was of other atoms.

The following was also found: at a radial position of 30 mm and in a depth range of 0 nm to about 3 nm from the surface, the proportion of carbon atoms was 75 at. %, the proportion of nitrogen atoms was 17 at. % and the balance was of other atoms. As a result of HFS and RBS analyses, it was found that the percentage of the number of hydrogen atoms based on the total number of carbon atoms and hydrogen atoms was 25% at radial positions of 19 mm and 30 mm. At a radial position of 19 mm and a depth of 5 nm, the hardness was 22 GPa and the Young's modulus 249 GPa. At a radial position of 30 mm and a depth of 5 nm, the hardness was 20 GPa and the Young's modulus 247 GPa.

On the other hand, 10 discs also having a lubricant layer formed thereon were individually set in a (CSS) evaluation apparatus and tested in the same manner as in Embodiment 1. As a result, all of the 10 discs underwent crash owing to less than 3,000 runs of CSS.

In addition, when 10 other discs also having a lubricant layer formed thereon were subjected to a seek test and surface observation in the same manner as in Embodiment 1, the surface of the protective film of each disc after completion of the test had some very slight scratches though so-called crash accompanying the fracture of the protective film did not occur. Thus, it turned out that sample No. 5 produced by the process according to Comparative Example 4 has a sufficient reliability on resistance to sliding in the data area but cannot have a sufficient reliability on resistance to sliding in the CSS area.

COMPARATIVE EXAMPLE 5

When a protective filmy layer 4 was formed in the protective-filmy-layer forming chamber 21, Ar gas containing no nitrogen was introduced into the chamber 21 at a rate of 24 sccm through a mass flow controller. In this case, the pressure was about 1.3 Pa (9.5 mTorr) as measured with a Baratron gauge. Then, DC 1000 W was applied to graphite sintering targets fixed on cathodes located on both sides of the substrate, to induce plasma. In this case, the discharge current was about 1.6 A and the discharge voltage about 625 V. By this sputtering method, the protective filmy layer 4 composed mainly of carbon was formed in a thickness of 8 nm on a Co—Cr—Ta—Pt alloy layer 3.

In this case, the build-up rate of the film was 0.9 nm/s. Sample No. 6 was produced by substantially the same process as in Embodiment 1 except for the above method for forming the protective filmy layer 4. Sample No. 6 was evaluated by the same methods as in Embodiment 1. As a result of ESCA analysis, the following was found: at a radial position of 19 mm and in a depth range of 0 nm to about 3 nm from the surface, the proportion of carbon atoms was 73 at. %, the proportion of nitrogen atoms was 15 at. % and the balance was of other atoms including mainly oxygen.

The following was also found: at a radial position of 30 mm and in a depth range of 0 nm to about 3 nm from the surface, the proportion of carbon atoms was 85 at. %, the proportion of nitrogen atoms was 6 at. % and the balance was of other atoms including mainly oxygen. As a result of HFS and RBS analyses, it was found that the percentage of the number of hydrogen atoms based on the total number of carbon atoms and hydrogen atoms was 5% at radial positions of 19 mm and 30 mm. At a radial position of 19 mm and a depth of 5 nm, the hardness was 14 GPa and the Young's modulus 200 GPa. At a radial position of 30 mm and a depth of 5 nm, the hardness was 6 GPa and the Young's modulus 105 GPa.

On the other hand, 10 discs also having a lubricant layer formed thereon were individually set in a (CSS) evaluation apparatus and tested in the same manner as in Embodiment 1. As a result, six of the 10 discs could clear 50,000 runs of CSS but the protective films of all the six discs after completion of the test were injured. The other four discs underwent crash owing to 20,000 to 30,000 runs of CSS. In addition, when 10 other discs also having a lubricant layer formed thereon were subjected to a seek test in the same manner as in Embodiment 1, all of these 10 discs underwent crash immediately owing to 3,000 or less revolutions.

COMPARATIVE EXAMPLE 6

When a protective filmy layer 4 was formed in the protective-filmy-layer forming chamber 21, Ar gas containing 30% $N_2$ and 15% $H_2$ was introduced into the chamber 21 at a rate of 24 sccm through a mass flow controller. In this case, the pressure was about 1 Pa (8.0 mTorr) as measured with a Baratron gauge. Then, DC 1000 W was applied to graphite sintering targets fixed on cathodes located on both sides of the substrate, to induce plasma. In this case, the discharge current was about 1.7 A and the discharge voltage about 590 V. By this so-called reactive sputtering method, the protective filmy layer 4 composed mainly of carbon and containing large amounts of nitrogen and hydrogen was formed in a thickness of 8 nm on a Co—Cr—Ta—Pt alloy layer 3. In this case, the build-up rate of the film was 0.9 nm/s.

Sample No. 7 was produced by substantially the same process as in Embodiment 1 except for the above method for forming the protective filmy layer 4. Sample No. 7 was evaluated by the same methods as in Embodiment 1. As a result of ESCA analysis, the following was found: at a radial position of 19 mm and in a depth range of 0 nm to about 3 nm from the surface, the proportion of carbon atoms was 73 at. %, the proportion of nitrogen atoms was 16 at. % and the balance was of other atoms including mainly oxygen. The following was also found: at a radial position of 30 mm and in a depth range of 0 nm to about 3 nm from the surface, the proportion of carbon atoms was 74 at. %, the proportion of nitrogen atoms was 17 at. % and the balance was of other atoms including mainly oxygen. As a result of HFS and RBS analyses, it was found that the percentage of the number of hydrogen atoms based on the total number of carbon atoms and hydrogen atoms was 5% at a radial position of 19 mm and 33% at a radial position of 30 mm. At a radial position of 19 mm and a depth of 5 nm, the hardness was 16 GPa and the Young's modulus 212 GPa. At a radial position of 30 mm and a depth of 10 nm, the hardness was 15 GPa and the Young's modulus 205 GPa.

On the other hand, 10 discs also having a lubricant layer formed thereon were individually set in a (CSS) evaluation apparatus and tested in the same manner as in Embodiment 1. As a result, all of the 10 discs finished the test without crash, and no injury was detected in the discs by subsequent surface observation. However, when the 10 discs were subjected to a seek test in the same manner as in Embodiment 1, their protective films gradually received slight scratches and were fractured in about 60 seconds, resulting in crash. Thus, it turned out that sample No. 7 produced by the process according to Comparative Example 6 has a sufficient reliability on resistance to sliding in the CSS area but cannot have a sufficient reliability on resistance to sliding in the data area.

COMPARATIVE EXAMPLE 7

When a protective filmy layer 5 was formed in the protective-filmy-layer forming chamber 22, Ar gas containing 50% $N_2$ was introduced into the chamber 22 at a rate of 15 sccm through a mass flow controller. In this case, the pressure was about 0.8 Pa (6.0 mTorr) as measured with a Baratron gauge. Then, DC 1000 W was applied to graphite sintering targets fixed on cathodes located on both sides of the substrate, to induce plasma. In this case, the discharge current was about 1.25 A and the discharge voltage about 800 V. By this so-called reactive sputtering method, the protective filmy layer 5 composed mainly of carbon and containing a large amount of nitrogen was formed in a thickness of 5 nm within a disc radius of 20.7 mm on a protective filmy layer 4. In this case, the build-up rate of the film was 1.1 nm/s.

Sample No. 8 was produced by substantially the same process as in Embodiment 1 except for the above method for forming the protective filmy layer 5. Sample No. 8 was evaluated by the same methods as in Embodiment 1. As a result of ESCA analysis, the following was found: at a radial position of 19 mm and in a depth range of 0 nm to about 3 nm from the surface, the proportion of carbon atoms was 73 at. %, the proportion of nitrogen atoms was 25 at. % and the balance was of other atoms including mainly oxygen. The following was also found: at a radial position of 30 mm and in a depth range of 0 nm to about 3 nm from the surface, the proportion of carbon atoms was 75 at. %, the proportion of nitrogen atoms was 17 at. % and the balance was of other atoms including mainly oxygen.

As a result of HFS and RBS analyses, it was found that the percentage of the number of hydrogen atoms based on the total number of carbon atoms and hydrogen atoms was 7% at a radial position of 19 mm and 25% at a radial position of 30 mm. At a radial position of 19 mm and a depth of 5 nm, the hardness was 12 GPa and the Young's modulus 150 GPa. At a radial position of 30 mm and a depth of 10 nm, the hardness was 20 Gpa and the Young's modulus 248 GPa.

On the other hand, 10 discs also having a lubricant layer formed thereon were individually set in a (CSS) evaluation apparatus and tested in the same manner as in Embodiment 1. As a result, two of the 10 discs finished the test consisting of 50,000 runs of CSS, and no injury was detected in the two discs by subsequent surface observation. However, the 8 other discs underwent crash owing to 10,000 to 25,000 runs of CSS. In addition, when 10 other discs also having a lubricant layer formed thereon were subjected to a seek test and surface observation in the same manner as in Embodiment 1, the surface of the protective film of each disc received some very slight scratches though so-called crash accompanying the fracture of the protective film did not occur. Thus, it turned out that sample No. 8 produced by the process according to Comparative Example 7 has a sufficient reliability on resistance to sliding in the data area but cannot have a sufficient reliability on resistance to sliding in the CSS area.

COMPARATIVE EXAMPLE 8

When a protective filmy layer 4 was formed in the protective-filmy-layer forming chamber 21, Ar gas containing 30% $N_2$ and 3% $H_2$ was introduced into the chamber 21 at a rate of 24 sccm through a mass flow controller. In this case, the pressure was about 1 Pa (8.0 mTorr) as measured with a Baratron gauge. Then, DC 1000 W was applied to graphite sintering targets fixed on cathodes located on both sides of the substrate, to induce plasma. In this case, the discharge current was about 1.6 A and the discharge voltage about 625 V. By this so-called reactive sputtering method, the protective filmy layer 4 composed mainly of carbon and containing large amounts of nitrogen and hydrogen was formed in a thickness of 8 nm on a Co—Cr—Ta—Pt alloy layer 3. In this case, the build-up rate of the film was 0.95 nm/s.

Sample No. 9 was produced by substantially the same process as in Embodiment 1 except for the above method for forming the protective filmy layer 4. Sample No. 9 was evaluated by the same methods as in Embodiment 1. As a result of ESCA analysis, the following was found: at a radial position of 19 mm and in a depth range of 0 nm to about 3 nm from the surface, the proportion of carbon atoms was 72 at. %, the proportion of nitrogen atoms was 15 at. % and the balance was of other atoms including mainly oxygen. The following was also found: at a radial position of 30 mm and in a depth range of 0 nm to about 3 nm from the surface, the proportion of carbon atoms was 74 at. %, the proportion of nitrogen atoms was 16 at. % and the balance was of other atoms including mainly oxygen.

As a result of HFS and RBS analyses, it was found that the percentage of the number of hydrogen atoms based on the total number of carbon atoms and hydrogen atoms was 5% at a radial position of 19 mm and 15% at a radial position of 30 mm. At a radial position of 19 mm and a depth of 5 nm, the hardness was 15 GPa and the Young's modulus 210 GPa. At a radial position of 30 mm and a depth of 5 nm, the hardness was 17 GPa and the Young's modulus 225 GPa.

On the other hand, 10 discs also having a lubricant layer formed thereon were individually set in a (CSS) evaluation apparatus and tested in the same manner as in Embodiment 1. As a result, all of the 10 discs finished the test without crash, and no injury was detected in the discs by subsequent surface observation. However, when the 10 discs were subjected to a seek test in the same manner as in Embodiment 1, their protective films gradually received slight scratches and were fractured in about 80 seconds, resulting in crash. Thus, it turned out that sample No. 9 produced by the process according to Comparative Example 8 has a sufficient reliability on resistance to sliding in the CSS area but cannot have a sufficient reliability on resistance to sliding in the data area.

COMPARATIVE EXAMPLE 9

When a protective filmy layer 5 was formed in the protective-filmy-layer forming chamber 22, Ar gas containing 10% $N_2$ was introduced into the chamber 22 at a rate of 15 sccm through a mass flow controller. In this case, the pressure was about 0.8 Pa (6.0 mTorr) as measured with a Baratron gauge. Then, DC 1000 W was applied to graphite sintering targets fixed on cathodes located on both sides of the substrate, to induce plasma. In this case, the discharge current was about 1.35 A and the discharge voltage about 740 V. By this so-called reactive sputtering method, the protective filmy layer 5 composed mainly of carbon and containing a large amount of nitrogen was formed in a thickness of 5 nm within a disc radius of 20.7 mm on a protective filmy layer 4. In this case, the build-up rate of the film was 1.0 nm/s.

Sample No. 10 was produced by substantially the same process as in Embodiment 1 except for the above method for forming the protective filmy layer 5. Sample No. 10 was evaluated by the same methods as in Embodiment 1. As a result of ESCA analysis, the following was found: at a radial position of 19 mm and in a depth range of 0 nm to about 3 nm from the surface, the proportion of carbon atoms was 73 at. %, the proportion of nitrogen atoms was 11 at. % and the balance was of other atoms including mainly oxygen. The following was also found: at a radial position of 30 mm and in a depth range of 0 nm to about 3 nm from the surface, the proportion of carbon atoms was 75 at. %, the proportion of nitrogen atoms was 17 at. % and the balance was of other atoms including mainly oxygen.

As a result of HFS and RBS analyses, it was found that the percentage of the number of hydrogen atoms based on the total number of carbon atoms and hydrogen atoms was 7% at a radial position of 19 mm and 24% at a radial position of 30 mm. At a radial position of 19 mm and a depth of 5 nm, the hardness was 13 GPa and the Young's modulus 170 GPa. At a radial position of 30 mm and a depth of 5 nm, the hardness was 19 GPa and the Young's modulus 248 GPa.

On the other hand, 10 discs also having a lubricant layer formed thereon were individually set in a (CSS) evaluation apparatus and tested in the same manner as in Embodiment 1. As a result, one of the 10 discs finished the test consisting of 50,000 runs of CSS, and no injury was detected in this disc by subsequent surface observation. However, the 9 other discs underwent crash owing to 15,000 to 25,000 runs of CSS. In addition, when 10 other discs also having a lubricant layer formed thereon were subjected to a seek test and surface observation in the same manner as in Embodiment 1, the surface of the protective film of each disc received some very slight scratches though so-called crash accompanying the fracture of the protective film did not occur. Thus, it turned out that sample No. 10 produced by the process according to Comparative Example 9 has a sufficient reliability on resistance to sliding in the data area but cannot have a sufficient reliability on resistance to sliding in the CSS area.

From the results obtained in Embodiment 1 and Comparative Examples 1 to 9, it was proved that in imparting a sufficient reliability on resistance to sliding to a magnetic disc having a very thin protective film composed of a protective film of 8 nm thick composed mainly of carbon in the data area and a protective film of 13 nm thick composed mainly of carbon in the CSS area, it is effective that said protective film in the data area is composed of carbon, nitrogen and hydrogen and has a hardness of 19 GPa or more as measured by the above-mentioned measuring method, and that said protective film in the CSS area is composed of carbon and nitrogen and has a hardness of 15 to 19 GPa as measured by the above-mentioned measuring method.

Embodiment 2

A substrate 1 was obtained by plating with Ni—P the same disc as described in Embodiment 1 except for changing the dimensions of the disc as follows: outside diameter 65 mm, inside diameter 20 mm, and thickness 0.8 mm. The substrate 1 was textured so that Ra=2 nm and Rp=15 nm. Then, projections having a height of 15 nm and a diameter of 3.5 μm were formed thereon at intervals of 10 μm by laser irradiation in the area corresponding to a disc radius range of 12.13 mm to 15.90 mm, and the thus treated substrate 1 was thoroughly washed. A magnetic recording medium comprising the substrate and a primer layer and a magnetic layer which had been formed on the substrate was produced in the same manner as in the case of the disc described in Embodiment 1 except for the above procedure.

Subsequently, this magnetic recording medium was conveyed to a protective-filmy-layer forming chamber 21, and a protective filmy layer 4 composed mainly of carbon and containing large amounts of nitrogen and hydrogen was formed in a thickness of 8 nm on a Co—Cr—Ta—Pt alloy layer 3 by a so-called reactive sputtering method using Ar gas containing 30% $N_2$ and 7.5% $H_2$.

Next, the substrate thus treated was conveyed to a protective-filmy-layer forming chamber 22. The protective-filmy-layer forming chamber 22 is equipped with the shields against sputtering particles 23 and 24 shown in FIG. 3, so as to have such a structure that a film is actively built up only in the whole area within a disc radius of 15.9 mm on the substrate where a magnetic head comes into contact with a protective film to be formed, at the time of starting and/or standing of the magnetic head and that build-up of a film is very difficult outside a disc radius of 15.9 mm. Ar gas containing 30% $N_2$ was introduced into the chamber 22 at a rate of 15 sccm through a mass flow controller while evacuating the chamber 22 with a turbo molecular pump. In this case, the pressure was about 0.9 Pa (6.5 mTorr) as measured with a Baratron gauge.

Then, DC 1000 W was applied to graphite sintering targets fixed on cathodes located on both sides of the substrate, to induce plasma. In this case, the discharge current was about 1.4 A and the discharge voltage about 710 V. By this so-called reactive sputtering method, a protective filmy layer 5 composed mainly of carbon and containing a large amount of nitrogen was formed in a thickness of 5 nm within a disc radius of 15.9 mm on the protective filmy layer 4. In this case, the build-up rate of the film was 1.0 nm/s.

The thus treated substrate was taken out of the vacuum tank and allowed to cool to room temperature spontaneously. A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The protective film of the disc produced in the manner described above was analyzed at an angle of detection of 30° by X-ray photoelectron spectroscopy (ESCA). As a result, the following was found: at a radial position of 15 mm and in a depth range of 0 nm to about 3 nm from the surface, the proportion of carbon atoms was 75 at. %, the proportion of nitrogen atoms was 15 at. % and the balance was of other atoms including mainly oxygen. The following was also found: at a radial position of 25 mm and in a depth range of 0 nm to about 3 nm from the surface, the proportion of carbon atoms was 77 at. %, the proportion of nitrogen atoms was 17 at. % and the balance was of other atoms including mainly oxygen. Thus, the amount of nitrogen in the protective filmy layer 4 and that in the protective filmy layer 5 were not widely different.

The protective film was subjected to hydrogen forward scattering spectroscopy (HFS) under the following conditions: He++ion beam energy=160 fJ (1 MeV); angle of detection 30°. It was also subjected to Rutherford backscattering spectroscopy (RBS) at an angle of detection of 160°. As a result, it was found that the percentage of the number of hydrogen atoms based on the total number of carbon atoms and hydrogen atoms was 5% at a radial position of 15 mm and 23% at a radial position of 25 mm, namely, the protective filmy layer 4 contained a large number of hydrogen atoms, while the protective filmy layer 5 did not contain a large number of hydrogen atoms.

Then, the hardness and Young's modulus of the protective film were measured at radial positions of 15 mm and 25 mm with a thin-film microhardness measuring apparatus (a nanoindenter) manufactured by Nano Instrument Co., in a definite-indentation-depth mode by using a Barkovich type diamond indenter having a radius of curvature of 0.1 μm. As a result, the following was found: at a radial position of 15 mm and a depth of 5 nm, the hardness was 17 GPa and the Young's modulus 216 GPa; and at a radial position of 25 mm and a depth of 5 nm, the hardness was 21 GPa and the Young's modulus 241 GPa. Thus, the protective filmy layer 4 had both a larger hardness value and a larger Young's modulus value than did the protective filmy layer 5.

On the other hand, ten of the discs also having the lubricant layer formed thereon were individually set in a contact-start-and-stop (CSS) evaluation apparatus and tested. When the 10 discs were subjected to CSS 50,000 times at a revolution rate of 10,000 r.p.m., all of the 10 discs finished the test without crash, and no injury was detected in the discs by subsequent microscopic observation of the surfaces of the discs. Thus, it was proved that the magnetic recording medium of the present invention has a sufficient reliability on resistance to sliding when the thickness of the protective film in the area where a magnetic head performs CSS is 13 nm.

Next, 0.1 g of alumina particles having an average particle size of 0.1 μm were casted on each of the 10 discs while carrying out random seeking of a magnetic head at 10,000 r.p.m. in the area other than the area where CSS was carried out, i.e., the so-called data area (corresponding to a disc radius range of 16 mm to 31 mm) where the protective film did not steadily come into contact with the magnetic head. After 120 seconds of the seeking, the disc surface was observed. As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective film in the data area is as very small as 8 nm. The above evaluation results are described in Table 1 as those for sample No. 11.

Embodiment 3

A substrate 1 obtained by plating an aluminum alloy base material (outside diameter 95 mm, inside diameter 25 mm, thickness 0.8 mm) with Ni—P was textured so that Ra=2 nm and Rp=15 nm. Then, projections having a height of 15 nm and a diameter of 3.5 μm were formed thereon at intervals of 10 μm by laser irradiation in the area corresponding to a disc radius R range of 18 to 20.7 mm, and the thus treated substrate 1 was thoroughly washed. The substrate 1 was introduced into a vacuum tank evacuated to about 5.3×10 E−5 Pa (4.0×10 E−7 Torr). First, the substrate 1 was conveyed to a heating chamber in the vacuum tank and heated to 260° C. with an IR heater.

Subsequently, the substrate 1 was conveyed to a primer-layer forming chamber and a Cr—10 at. % Mo—7.5 at. % Ti alloy primer layer 2 was formed thereon in a thickness of 30 nm by a DC magnetron sputtering method under an Ar atmosphere at about 0.8 Pa (6 mTorr). Then, the substrate 1 was conveyed to a magnetic-recording-layer forming chamber and a Co—20 at. % Cr—4 at. % Ta—8 at. % Pt alloy layer 3 was formed thereon in a thickness of 22 nm by a DC magnetron sputtering method under an Ar atmosphere at about 0.9 Pa (7 mTorr). Using this substrate having the Cr—10 at. % Mo—7.5 at. % Ti alloy primer layer 2 and Co—20 at. % Cr—4 at. % Ta—8 at. % Pt alloy layer 3 formed thereon, the following protective filmy layers composed mainly of carbon according to the present invention were formed.

As the above-mentioned substrate 1, there can be used, for example, rigid substrates made of ceramics of chemically strengthened aluminosilicate, soda-lime glass, silicon, borosilicate glass, etc. or made of glass-glazed ceramics, as well as Al—Mg alloy substrates subjected to nonelectrode plating with Ni—P.

The primer layer 2 is used as a primer film for controlling the crystalline orientation of the magnetic layer formed thereon. As the primer layer, there can also be used thin films of Cr-based alloys such as nonmagnetic Cr—V, Cr—Ti, Cr—Mo, Cr—Si and Cr—Mo—Ti alloys which form disordered solid solutions capable of being subjected to (100) orientation good in crystal matching with the magnetic film. When the primer layer was formed by adding 0.5 vol % to 50 vol % of nitrogen to a gas for discharge used in the sputtering, the refinement of grains of the primer layer took place. Consequently, grains of the magnetic layer subsequently formed were also refined, so that medium noise could be reduced.

As the magnetic layer 3, there can be used not only Co—Cr—Pt—Ta alloys but also multi-component alloy systems which are composed mainly of Co, contain Pt for increasing the coercive force and contain Cr, Ta, $SiO_2$, Nb, etc. for reducing medium noise. Particularly when Ta, Nb, V or Ti was added, the melting point of a target was lowered, so that the progress of component separation of the magnetic film containing Cr was desirably facilitated. Co-based alloy systems containing Pt, Ni or Mn are practical because their anisotropy energy does not decrease so much as that of Co-based alloy systems containing any other additive element.

Specifically, there can be used alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$, etc., as well as Co—Cr—Pt. As to the composition of the Co alloy layer constituting the ferromagnetic portion, the amount of Cr incorporated as a solid solution is considered to be 5 to 10 at. % and the amount of Ta incorporated as a solid solution about 2 at. %. When the Co alloy magnetic layer is formed by incorporating Cr and Ta in amounts larger than the above amounts, magnetic separation in the magnetic layer proceeds, resulting in reduced medium noise.

As a practical composition, there can be used, for example,
Co—20 at. % Cr—4 at. % Ta—8 at. % Pt alloy,
Co—22 at. % Cr—20 at. % Pt alloy,
Co—15 at. % Cr—8 at. % Pt—20 mol. % $SiO_2$ alloy,
Co—17 at. % Cr—12 at. % Pt—5 at. % Mn alloy,
Co—17 at. % Cr—5 at. % Nb—10 at. % Pt alloy,
Co—20 at. % Cr—5 at. % V—12 at. % Pt alloy,
Co—20 at. % Cr—10 at. % V—15 at. % Pt alloy, and
Co—15 at. % Cr—5 at. % Nb—5 at. % Ta—20 at. % Pt alloy.

The above-mentioned substrate was conveyed to the protective-filmy-layer forming chamber 21 shown in FIG. 2 without taking out the substrate from the vacuum tank. Ar gas containing 30% $N_2$ and 5.5% $H_2$ was introduced into the chamber 21 at a rate of 24 sccm (Standard cubic centimeter per minute) through a mass flow controller while evacuating the protective-filmy-layer forming chamber 21 with a turbo molecular pump. In this case, the pressure was about 1 Pa (8 mTorr) as measured with a Baratron gauge. Then, DC 1000 W was applied to graphite sintering targets fixed on cathodes located on both sides of the substrate, to induce plasma. In this case, the discharge current was about 1.5 A and the discharge voltage about 670 V. By this so-called reactive sputtering method, a protective filmy layer 4 composed mainly of carbon and containing large amounts of nitrogen and hydrogen was formed in a thickness of 8 nm on the Co—Cr—Ta—Pt alloy layer 3. In this case, the build-up rate of the film was 0.8 nm/s.

Next, the thus treated substrate was conveyed to a protective-filmy-layer forming chamber 22. The protective-filmy-layer forming chamber 22 is equipped with the shields against sputtering particles 23 and 24 shown in FIG. 3, so as to have such a structure that a film is actively built up only in the whole area within a disc radius of 20.7 mm on the substrate where a magnetic head comes into contact with a protective film to be formed, at the time of starting and/or standing of the magnetic head and that build-up of a film is very difficult outside a disc radius of 20.7 mm. Ar gas containing 25% $N_2$ was introduced into the chamber 22 at a rate of 15 sccm through a mass flow controller while evacuating the protective-filmy-layer forming chamber 22 with a turbo molecular pump. In this case, the pressure was about 0.9 Pa (6.5 mTorr) as measured with a Baratron gauge.

Then, DC 1000 W was applied to graphite sintering targets fixed on cathodes located on both sides of the substrate, to induce plasma. In this case, the discharge current was about 1.4 A and the discharge voltage about 700 V. By this so-called reactive sputtering method, a protective filmy layer 5 composed mainly of carbon and containing a large amount of nitrogen was formed in a thickness of 5 nm within a disc radius of 20.7 mm on the protective filmy layer 4. In this case, the build-up rate of the film was 0.5 nm/s.

The thus treated substrate was taken out of the vacuum tank and allowed to cool to room temperature spontaneously. A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The protective film of the disc produced in the manner described above was analyzed at an angle of detection of 300 by X-ray photoelectron spectroscopy (ESCA). As a result, the following was found: at a radial position of 19 mm and in a depth range of 0 nm to about 3 nm from the surface, the proportion of carbon atoms was 78 at. %, the proportion of nitrogen atoms was 13 at. % and the balance was of other atoms including mainly oxygen. The following was also found: at a radial position of 30 mm and in a depth range of 0 nm to about 3 nm from the surface, the proportion of carbon atoms was 77 at. %, the proportion of nitrogen atoms was 16 at. % and the balance was of other atoms including mainly oxygen. Thus, the amount of nitrogen in the protective filmy layer 4 and that in the protective filmy layer 5 were not widely different.

The protective film was subjected to hydrogen forward scattering spectroscopy (HFS) under the following conditions: He++ion beam energy=160 fJ (1 MeV); angle of detection 30°. It was also subjected to Rutherford backscattering spectroscopy (RBS) at an angle of detection of 160°. As a result, it was found that the percentage of the number of hydrogen atoms based on the total number of carbon atoms and hydrogen atoms was 6% at a radial position of 19 mm and 20% at a radial position of 30 mm, namely, the protective filmy layer 4 contained a large number of hydrogen atoms, while the protective filmy layer 5 did not contain a large number of hydrogen atoms.

Then, the hardness and Young's modulus of the protective film were estimated at radial positions of 19 mm and 30 mm. The hardness and Young's modulus referred to here are those measured with a thin-film microhardness measuring apparatus (a nanoindenter) manufactured by Nano Instrument Co., in a definite-indentation-depth mode by using a Barkovich type diamond indenter having a radius of curvature of 0.1 $\mu$m. As a result, the following was found: at a radial position of 19 mm and a depth of 5 nm, the hardness was 15 GPa and the Young's modulus 209 GPa; and at a radial position of 30 mm and a depth of 5 nm, the hardness was 19 GPa and the Young's modulus 236 GPa. Thus, the protective filmy layer 4 had both a larger hardness value and a larger Young's modulus value than did the protective filmy layer 5.

On the other hand, ten of the discs also having the lubricant layer formed thereon were individually set in a contact-start-and-stop (CSS) evaluation apparatus and tested. When the 10 discs were subjected to CSS 50,000 times at a revolution rate of 7,500 r.p.m., all of the 10 discs finished the test without crash. When their surfaces after the test were carefully observed under a microscope and carefully and visually observed by oblique light, no injury was detected in the discs. Thus, it was proved that the magnetic recording medium of the present invention has a sufficient reliability on resistance to sliding when the thickness of the protective film in the CSS area is 13 nm.

Next, 0.1 g of alumina particles having an average particle size of 0.1 $\mu$m were casted on each of the 10 discs while carrying out random seeking of a magnetic head at 7,500 r.p.m. in the area other than the area where CSS was carried out, i.e., the so-called data area (corresponding to a disc radius range of 21 mm to 46 mm) where the protective film did not steadily come into contact with the magnetic head. After 120 seconds of the seeking, the disc surface was observed under a microscope and visually observed by oblique light.

As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective film in the data area is as very small as 8 nm. The above evaluation results are described in Table 1 as those for sample No. 12.

Embodiment 4

A substrate 1 obtained by plating an aluminum alloy base material (outside diameter 95 mm, inside diameter 25 mm, thickness 0.8 mm) with Ni—P was textured so that Ra=2 nm and Rp=15 nm. Then, projections having a height of 15 nm and a diameter of 3.5 $\mu$m were formed thereon at intervals of 10 $\mu$m by laser irradiation in the area corresponding to a disc radius R range of 18 to 20.7 mm, and the thus treated substrate 1 was thoroughly washed. The substrate 1 was introduced into a vacuum tank evacuated to about 5.3×10 E–5 Pa (4.0×10 E–7 Torr). First, the substrate 1 was conveyed to a heating chamber in the vacuum tank and heated to 260° C. with an IR heater. Then, the substrate 1 was conveyed to a primer-layer forming chamber and a Cr—10 at. % Mo—7.5 at. % Ti alloy primer layer 2 was formed thereon in a thickness of 30 nm by a DC magnetron sputtering method under an Ar atmosphere at about 0.8 Pa (6 mTorr).

Subsequently, the substrate 1 was conveyed to a magnetic-recording-layer forming chamber and a Co—20 at. % Cr—4 at. % Ta—8 at. % Pt alloy layer 3 was formed thereon in a thickness of 22 nm by a DC magnetron sputtering method under an Ar atmosphere at about 0.9 Pa (7 mTorr). Using this substrate having the Cr—10 at. % Mo—7.5 at. % Ti alloy primer layer 2 and Co—20 at. % Cr—4 at. % Ta—8 at. % Pt alloy layer 3 formed thereon, the following protective filmy layers composed mainly of carbon according to the present invention were formed.

As the above-mentioned substrate 1, there can be used, for example, rigid substrates made of ceramics of chemically strengthened aluminosilicate, soda-lime glass, silicon, borosilicate glass, etc. or made of glass-glazed ceramics, as well as Al—Mg alloy substrates subjected to nonelectrode plating with Ni—P.

The primer layer 2 is used as a primer film for controlling the crystalline orientation of the magnetic layer formed thereon. As the primer layer, there can also be used thin films of Cr-based alloys such as nonmagnetic Cr—V, Cr—Ti, Cr—Mo, Cr—Si and Cr—Mo—Ti alloys which form disordered solid solutions capable of being subjected to (100) orientation good in crystal matching with the magnetic film. When the primer layer was formed by adding 0.5 vol % to 50 vol % of nitrogen to a gas for discharge used in the sputtering, the refinement of grains of the primer layer took place. Consequently, grains of the magnetic layer subsequently formed were also refined, so that medium noise could be reduced.

As the magnetic layer 3, there can be used not only Co—Cr—Pt—Ta alloys but also multi-component alloy systems which are composed mainly of Co, contain Pt for increasing the coercive force and contain Cr, Ta, $SiO_2$, Nb, etc. for reducing medium noise. Particularly when Ta, Nb, V or Ti was added, the melting point of a target was lowered, so that the progress of component separation of the magnetic film containing Cr was desirably facilitated. Co-based alloy systems containing Pt, Ni or Mn are practical because their anisotropy energy does not decrease so much as that of Co-based alloy systems containing any other additive element.

Specifically, there can be used alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$, etc., as well as Co—Cr—Pt. As to the composition of the Co alloy layer constituting the ferromagnetic portion, the amount of Cr incorporated as a solid solution is considered to be 5 to 10 at. % and the amount of Ta incorporated as a solid solution about 2 at. %. When the Co alloy magnetic layer is formed by incorporating Cr and Ta in amounts larger than the above amounts, magnetic separation in the magnetic layer proceeds, resulting in reduced medium noise.

As a practical composition, there can be used, for example,
Co—20 at. % Cr—4 at. % Ta—8 at. % Pt alloy,
Co—22 at. % Cr—20 at. % Pt alloy,
Co—15 at. % Cr—8 at. % Pt—20 mol. % $SiO_2$ alloy,
Co—17 at. % Cr—12 at. % Pt—5 at. % Mn alloy,
Co—17 at. % Cr—5 at. % Nb—10 at. % Pt alloy,
Co—20 at. % Cr—5 at. % V—12 at. % Pt alloy,
Co—20 at. % Cr—10 at. % V—15 at. % Pt alloy, and
Co—15 at. % Cr—5 at. % Nb—5 at. % Ta—20 at. % Pt alloy.

The above-mentioned substrate was conveyed to the protective-filmy-layer forming chamber 21 shown in FIG. 2 without taking out the substrate from the vacuum tank. Ar gas containing 25% $N_2$ and 9% $H_2$ was introduced into the chamber 21 at a rate of 24 sccm (Standard cubic centimeter per minute) through a mass flow controller while evacuating the protective-filmy-layer forming chamber 21 with a turbo molecular pump. In this case, the pressure was about 1 Pa (8 mTorr) as measured with a Baratron gauge. Then, DC 1000 W was applied to graphite sintering targets fixed on cathodes located on both sides of the substrate, to induce plasma. In this case, the discharge current was about 1.6 A and the discharge voltage about 630 V. By this so-called reactive sputtering method, a protective filmy layer 4 composed mainly of carbon and containing large amounts of nitrogen and hydrogen was formed in a thickness of 8 nm on the Co—Cr—Ta—Pt alloy layer 3. In this case, the build-up rate of the film was 0.8 nm/s.

Next, the thus treated substrate was conveyed to a protective-filmy-layer forming chamber 22. The protective-filmy-layer forming chamber 22 is equipped with the shields against sputtering particles 23 and 24 shown in FIG. 3, so as to have such a structure that a film is actively built up on only in the whole area within a disc radius of 20.7 mm on the substrate where a magnetic head comes into contact with a protective film to be formed, at the time of starting and/or standing of the magnetic head and that build-up of a film is very difficult outside a disc radius of 20.7 mm. Ar gas containing 35% $N_2$ was introduced into the chamber 22 at a rate of 15 sccm through a mass flow controller while evacuating the protective-filmy-layer forming chamber 22 with a turbo molecular pump. In this case, the pressure was about 0.9 Pa (6.5 mTorr) as measured with a Baratron gauge.

Then, DC 1000 W was applied to graphite sintering targets fixed on cathodes located on both sides of the substrate, to induce plasma. In this case, the discharge current was about 1.4 A and the discharge voltage about 710 V. By this so-called reactive sputtering method, a protective filmy layer 5 composed mainly of carbon and containing a large amount of nitrogen was formed in a thickness of 5 nm within a disc radius of 20.7 mm on the protective filmy layer 4. In this case, the build-up rate of the film was 0.5 nm/s.

The thus treated substrate was taken out of the vacuum tank and allowed to cool to room temperature spontaneously.

A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The protective film of the disc produced in the manner described above was analyzed at an angle of detection of 30° by X-ray photoelectron spectroscopy (ESCA). As a result, the following was found: at a radial position of 19 mm and in a depth range of 0 nm to about 3 nm from the surface, the proportion of carbon atoms was 75 at. %, the proportion of nitrogen atoms was 19 at. % and the balance was of other atoms including mainly oxygen. The following was also found: at a radial position of 30 mm and in a depth range of 0 nm to about 3 nm from the surface, the proportion of carbon atoms.was 77 at. %, the proportion of nitrogen atoms was 15 at. % and the balance was of other atoms including mainly oxygen. Thus, the amount of nitrogen in the protective filmy layer 4 and that in the protective filmy layer 5 were not widely different.

The protective film was subjected to hydrogen forward scattering spectroscopy (HFS) under the following conditions: He++ion beam energy=160 fJ (1 MeV); angle of detection 30°. It was also subjected to Rutherford backscattering spectroscopy (RBS) at an angle of detection of 160°. As a result, it was found that the percentage of the number of hydrogen atoms based on the total number of carbon atoms and hydrogen atoms was 7% at a radial position of 19 mm and 28% at a radial position of 30 mm, namely, the protective filmy layer 4 contained a large number of hydrogen atoms, while the protective filmy layer 5 did not contain a large number of hydrogen atoms.

Then, the hardness and Young's modulus of the protective film were estimated at radial positions of 19 mm and 30 mm. The hardness and Young's modulus referred to here are those measured with a thin-film microhardness measuring apparatus (a nanoindenter) manufactured by Nano Instrument Co., in a definite-indentation-depth mode by using a Barkovich type diamond indenter having a radius of curvature of 0.1 $\mu$m. As a result, the following was found: at a radial position of 19 mm and a depth of 5 nm, the hardness was 18.5 GPa and the Young's modulus 219 GPa; and at a radial position of 30 mm and a depth of 5 nm, the hardness was 19 GPa and the Young's modulus 240 GPa. Thus, the protective filmy layer 4 had both a larger hardness value and a larger Young's modulus value than did the protective filmy layer 5.

On the other hand, ten of the discs also having the lubricant layer formed thereon were individually set in a contact-start-and-stop (CSS) evaluation apparatus and tested. When the 10 discs were subjected to CSS 50,000 times at a revolution rate of 7,500 r.p.m., all of the 10 discs finished the test without crash. When their surfaces after the test were carefully observed under a microscope and carefully and visually observed by oblique light, no injury was detected in the discs. Thus, it was proved that the magnetic recording medium of the present invention has a sufficient reliability on resistance to sliding when the thickness of the protective film in the CSS area is 13 nm.

Next, 0.1 g of alumina particles having an average particle size of 0.1 $\mu$m were casted on each of the 10 discs while carrying out random seeking of a magnetic head at 7,500 r.p.m. in the area other than the area where CSS was carried out, i.e., the so-called data area (corresponding to a disc radius range of 21 mm to 46 mm) where the protective film did not steadily come into contact with the magnetic head. After 120 seconds of the seeking, the disc surface was observed under a microscope and visually observed by oblique light.

As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective film in the data area is as very small as 8 nm. The above evaluation results are described in Table 1 as those for sample No. 13.

Embodiment 5

A substrate 1 was obtained by plating with Ni—P the same disc as described in Embodiment 1 except for changing the dimensions of the disc as follows: outside diameter 84 mm, inside diameter 20 mm, and thickness 0.8 mm. The substrate 1 was textured so that Ra=2 nm and Rp=15 nm. Then, projections having a height of 15 nm and a diameter of 3.5 $\mu$m were formed thereon at intervals of 10 $\mu$m by laser irradiation in the area corresponding to a disc radius range of 12.13 mm to 15.90 mm, and the thus treated substrate 1 was thoroughly washed. A magnetic recording medium comprising the substrate and a primer layer and a magnetic layer which had been formed on the substrate was produced in the same manner as in the case of the disc described in Embodiment 1 except for the above procedure.

Subsequently, this magnetic recording medium was conveyed to a protective-filmy-layer forming chamber 21, and a protective filmy layer 4 composed mainly of carbon and containing large amounts of nitrogen and hydrogen was formed in a thickness of 8 nm on the Co—Cr—Ta—Pt alloy layer 3 by a so-called reactive sputtering method using Ar gas containing 30% $N_2$ and 7.5% $H_2$.

Next, the substrate thus treated was conveyed to a protective-filmy-layer forming chamber 22. The protective-filmy-layer forming chamber 22 is equipped with the shields against sputtering particles 23 and 24 shown in FIG. 3, so as to have such a structure that a film is actively built up only in the whole area within a disc radius of 15.9 mm on the substrate where a magnetic head comes into contact with a protective film to be formed, at the time of starting and/or standing of the magnetic head and that build-up of a film is very difficult outside a disc radius of 15.9 mm. Ar gas containing 30% $N_2$ was introduced into the chamber 22 at a rate of 15 sccm through a mass flow controller while evacuating the chamber 22 with a turbo molecular pump. In this case, the pressure was about 0.9 Pa (6.5 mTorr) as measured with a Baratron gauge.

Then, DC 1000 W was applied to graphite sintering targets fixed on cathodes located on both sides of the substrate, to induce plasma. In this case, the discharge current was about 1.4 A and the discharge voltage about 710 V. By this so-called reactive sputtering method, a protective filmy layer 5 composed mainly of carbon and containing a large amount of nitrogen was formed in a thickness of 5 nm within a disc radius of 15.9 mm on the protective filmy layer 4. In this case, the build-up rate of the film was 1.0 nm/s.

The thus treated substrate was taken out of the vacuum tank and allowed to cool to room temperature spontaneously. A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The protective film of the disc produced in the manner described above was analyzed at an angle of detection of 30° by X-ray photoelectron spectroscopy (ESCA). As a result, the following was found: at a radial position of 15 mm and in a depth range of 0 nm to about 3 nm from the surface, the proportion of carbon atoms was 74 at. %, the proportion of nitrogen atoms was 15 at. % and the balance was of other atoms including mainly oxygen. The following was also found: at a radial position of 25 mm and in a depth range of 0 nm to about 3 nm from the surface, the proportion of carbon atoms was 75 at. %, the proportion of nitrogen atoms was 16 at. % and the balance was of other atoms including mainly oxygen. Thus, the amount of nitrogen in the protective filmy layer 4 and that in the protective filmy layer 5 were not widely different.

The protective film was subjected to hydrogen forward scattering spectroscopy (HFS) under the following conditions: He++ion beam energy=160 fJ (1 MeV); angle of detection 30°. It was also subjected to Rutherford backscattering spectroscopy (RBS) at an angle of detection of 160°. As a result, it was found that the percentage of the number of hydrogen atoms based on the total number of carbon atoms and hydrogen atoms was 7% at a radial position of 15 mm and 24% at a radial position of 25 mm, namely, the protective filmy layer 4 contained a large number of hydrogen atoms, while the protective filmy layer 5 did not contain a large number of hydrogen atoms.

Then, the hardness and Young's modulus of the protective film were measured at radial positions of 15 mm and 25 mm with a thin-film microhardness measuring apparatus (a nanoindenter) manufactured by Nano Instrument Co., in a definite-indentation-depth mode by using a Barkovich type diamond indenter having a radius of curvature of 0.1 $\mu$m. As a result, the following were found: at a radial position of 15 mm and a depth of 5 nm, the hardness was 16 GPa and the Young's modulus 215 GPa; and at a radial position of 25 mm and a depth of 5 nm, the hardness was 20 GPa and the Young's modulus 239 GPa. Thus, the protective filmy layer 4 had both a larger hardness value and a larger Young's modulus value than did the protective filmy layer 5.

On the other hand, ten of the discs also having the lubricant layer formed thereon were individually set in a contact-start-and-stop (CSS) evaluation apparatus and tested. When the 10 discs were subjected to CSS 50,000 times at a revolution rate of 10,000 r.p.m., all of the 10 discs finished the test without crash, and no injury was detected in the discs by subsequent microscopic observation of the surfaces of the discs. Thus, it was proved that the magnetic recording medium of the present invention has a sufficient reliability on resistance to sliding when the thickness of the protective film in the area where a magnetic head performs CSS is 13 nm.

Next, 0.1 g of alumina particles having an average particle size of 0.1 $\mu$m were casted on each of the 10 discs while carrying out random seeking of a magnetic head at 10,000 r.p.m. in the area other than the area where CSS was carried out, i.e., the so-called data area (corresponding to a disc radius range of 16 mm to 41 mm) where the protective film did not steadily come into contact with the magnetic head. After 120 seconds of the seeking, the disc surface was observed. As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective film in the data area is as very small as 8 nm. The above evaluation results are described in Table 1 as those for sample No. 14.

TABLE 1

Physical properties of the protective film of each sample and sliding test results

| Sample | ESCA-N(at. %) | | RBS, HFS-H (%) | | Microhardness (GPa) | | CSS | Seek |
|---|---|---|---|---|---|---|---|---|
| | R 19 mm | R 30 mm | R 19 mm | R 30 mm | R 19 mm | R 30 mm | | |
| 1 | 15 | 17 | 8 | 23 | 17 | 21 | ○ | ○ |
| 2 | 15 | 17 | 22 | 25 | 20 | 20 | x | ○ |
| 3 | 5 | 17 | 7 | 22 | 7 | 21 | x | ○ |
| 4 | 15 | 17 | 5 | 5 | 16 | 17 | ○ | x |
| 5 | 15 | 17 | 25 | 25 | 22 | 20 | x | ○ |
| 6 | 15 | 6 | 5 | 5 | 14 | 6 | Δ | x |
| 7 | 16 | 17 | 5 | 33 | 16 | 15 | ○ | x |
| 8 | 25 | 15 | 7 | 25 | 12 | 20 | Δ | ○ |
| 9 | 15 | 16 | 5 | 15 | 15 | 17 | ○ | x |
| 10 | 11 | 17 | 7 | 24 | 13 | 19 | Δ | ○ |
| 11 | 15(R 15 mm) | 17(R 25 mm) | 5(R 15 mm) | 23(R 25 mm) | 17(R 15 mm) | 21(R 25 mm) | ○ | ○ |
| 12 | 13 | 16 | 6 | 20 | 15 | 19 | ○ | ○ |
| 13 | 19 | 15 | 7 | 28 | 18.5 | 19 | ○ | ○ |
| 14 | 15(R 15 mm) | 16(R 25 mm) | 7(R 15 mm) | 24(R 25 mm) | 16(R 15 mm) | 20(R 25 mm) | ○ | ○ |

Figure 8A:
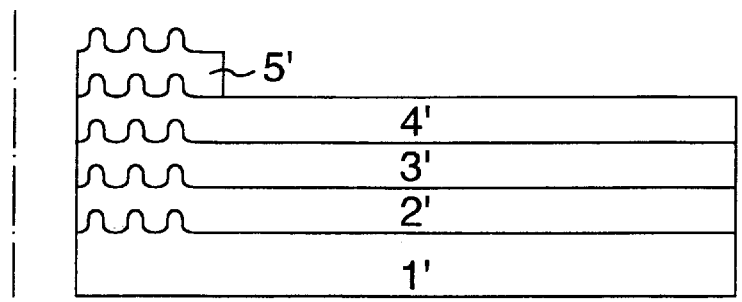
FIG. 8A, FIG. 8B and FIG. 8C are schematic cross-sectional views of a magnetic recording medium according to another embodiment of the present invention.
Figure 8B:
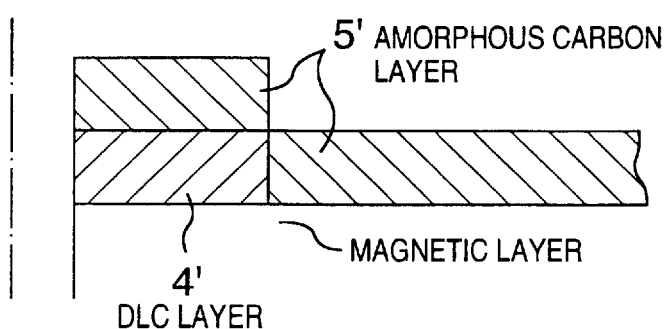
Figure 8C:
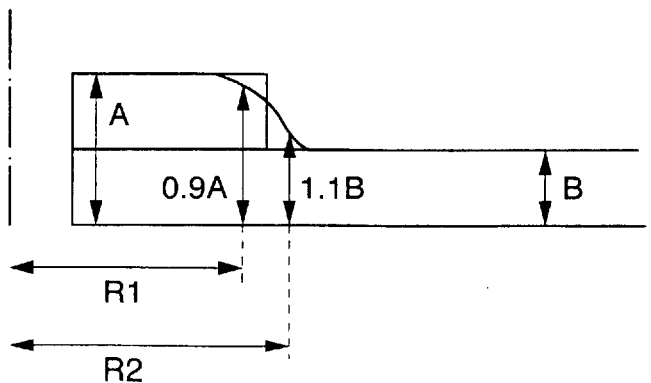

Embodiments of the present invention are further explained below. Another example of embodiment of the present invention is shown in FIG. 8A, FIG. 8B and FIG. 8C.

Embodiment 6

A substrate 1' obtained by plating an aluminum alloy base material (outside diameter 95 mm, inside diameter 25 mm, thickness 0.8 mm) with Ni—P was textured so that Ra=2 nm and Rp=15 nm (Ra and Rp are indications of roughness). Then, projections having a height of 15 nm and a diameter of 3.5 Am were formed thereon at intervals of 10 μm by laser irradiation in the area corresponding to a disc radius range of 18.0 to 20.5 mm, and the thus treated substrate 1' was thoroughly washed.

The substrate 1' was introduced into a vacuum tank evacuated to about 5.3×10 E-5 Pa (4.0×10 E-7 Torr). First, the substrate 1' was conveyed to a heating chamber in the vacuum tank and heated to 260° C. with an IR heater (infrared heater). Then, the substrate 1' was conveyed to a primer-layer forming chamber and a Cr—10 at. % Mo—7.5 at. % Ti alloy primer layer 2' was formed thereon in a thickness of 30 nm by a DC magnetron sputtering method under an Ar atmosphere at about 0.8 Pa (6 mTorr).

Subsequently, the substrate 1' was conveyed to a magnetic-recording-layer forming chamber and a Co—20 at. % Cr—4 at. % Ta—8 at. % Pt alloy layer 3' (capable of forming a magnetic layer) was formed thereon in a thickness of 22 nm by a DC magnetron sputtering method under an Ar atmosphere at about 0.9 Pa (7 mTorr). Using this substrate having the Cr—10 at. % Mo—7.5 at. % Ti alloy primer layer 2' and Co—20 at. % Cr—4 at. % Ta—8 at. % Pt alloy layer 3' formed thereon, the following protective filmy layers composed mainly of carbon according to the present invention were formed.

As the above-mentioned substrate 1', there can be used, for example, rigid substrates made of ceramics of chemically strengthened aluminosilicate, soda-lime glass, silicon, borosilicate glass, etc. or made of glass-glazed ceramics, as well as Al—Mg alloy substrates subjected to nonelectrode plating with Ni—P.

The primer layer 2' is used as a primer film for controlling the crystalline orientation of the magnetic layer formed thereon. As the primer layer, there can also be used thin films of Cr-based alloys such as nonmagnetic Cr—V, Cr—Ti, Cr—Mo, Cr—Si and Cr—Mo—Ti alloys which form disordered solid solutions capable of being subjected to (100) orientation good in crystal matching with the magnetic layer.

When the primer layer was formed by adding 0.5 vol % to 50 vol % of nitrogen to a gas for discharge used in the sputtering, the refinement of grains of the primer layer took place. Consequently, grains of the magnetic layer subsequently formed were also refined, so that medium noise could be reduced.

As the magnetic layer 3', there can be used not only Co—Cr—Ta—Pt alloys but also multi-component alloy systems which are composed mainly of Co, contain Pt for increasing the coercive force and contain Cr, Ta, $SiO_2$, Nb, etc. for reducing medium noise. Particularly when Ta, Nb, V or Ti was added, the melting point of a target was lowered, so that the progress of component separation of the magnetic layer containing Cr was desirably facilitated.

Co-based alloy systems containing Pt, Ni or Mn are practical because their anisotropy energy does not decrease so much as that of Co-based alloy systems containing any other additive element. Specifically, there can be used alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$, etc., as well as Co—Cr—Pt. As to the composition of the Co alloy layer constituting the ferromagnetic portion, the amount of Cr incorporated as a solid solution is considered to be 5 to 10 at. % and the amount of Ta incorporated as a solid solution about 2 at. %. When the Co alloy magnetic layer is formed by incorporating Cr and Ta in amounts larger than the above amounts, magnetic separation in the magnetic layer proceeds, resulting in reduced medium noise.

As a practical composition, there can be used, for example,
Co—20 at. % Cr—4 at. % Ta—8 at. % Pt alloy,
Co—22 at. % Cr—20 at. % Pt alloy,
Co—15 at. % Cr—8 at. % Pt—20 mol. % $SiO_2$ alloy,
Co—17 at. % Cr—12 at. % Pt—5 at. % Mn alloy,
Co—17 at. % Cr—5 at. % Nb—10 at. % Pt alloy,
Co—20 at. % Cr—5 at. % V—12 at. % Pt alloy,
Co—20 at. % Cr—10 at. % V—15 at. % Pt alloy, and
Co—15 at. % Cr—5 at. % Nb—5 at. % Ta—20 at. % Pt alloy.

In FIG. 8A, the left side of the diagram shows the inner-periphery side on which the projections are present, i.e., the CSS area. The right side of the diagram shows the outer-periphery side, i.e., the data area.

The above-mentioned substrate was conveyed to the protective-filmy-layer forming chamber 21' shown in FIG.

9, i.e., a chamber for forming a protective filmy layer by an ion beam method, without taking out the substrate from the vacuum tank. The protective-filmy-layer forming chamber 21' comprises ion guns consisting of a hot filament 22', an anode 23' and a grid 24' located in front of the hot filament. The protective-filmy-layer forming chamber 21' is also equipped with shields against deposited particles 25' so as to have such a structure that a film is actively built up only in the whole area within a disc radius of 20.7 mm on the substrate where a magnetic head comes into contact with a protective film to be formed, at the time of starting and/or standing of the magnetic head and that build-up of a film is very difficult outside a disc radius of 20.7 mm. That is, a film is formed only on the inner-periphery side of the disc, i.e., the CSS area, by the ion beam method. From behind the anode, Ar gas and ethylene ($C_2H_4$) gas were introduced into the chamber 21', each at a rate of 15 sccm (Standard Cubic centimeter per minute) through a mass flow controller while evacuating the protective-filmy-layer forming chamber 21' with a turbo molecular pump. In this case, the pressure was about 0.5 Pa (4 mTorr) as measured with a Baratron gauge.

Then, plasma was induced by applying 350 mA and direct current +120 V to the hot filament and anode, respectively, of each of the ion guns located on both sides of the substrate. Ions were extracted by applying –530 V to the grids. Further, a pulse bias of –80 V and 3 kHz was applied to the substrate. In this case, the anode current was 500 mA and the bias current of the substrate was 120 mA. By this so-called ion beam deposition method (IBD), a DLC protective filmy layer 4' composed mainly of carbon and hydrogen was formed in a thickness of 5 nm within a disc radius of 20.7 mm on the Co—Cr—Ta—Pt alloy layer 3'. In this case, the build-up rate of the film was 1.0 nm/s.

Subsequently, the thus treated substrate was conveyed to the protective-filmy-layer forming chamber 31' shown in FIG. 10, i.e., a chamber for forming a protective filmy layer by a sputtering method. Ar gas containing 30% $N_2$ and 6.0% $H_2$ was introduced into the chamber 31' at a rate of 24 sccm through a mass flow controller while evacuating the protective-filmy-layer forming chamber 31' with a turbo molecular pump. In this case, the pressure was about 1 Pa (8 mTorr) as measured with a Baratron gauge. Then, DC 1000 W was applied to graphite sintering targets fixed on cathodes located on both sides of the substrate, to induce plasma. In this case, the discharge current was about 1.5 A and the discharge voltage about 670 V. By this so-called reactive sputtering method, an amorphous carbon protective filmy layer 5' composed mainly of carbon and nitrogen and containing hydrogen was formed in a thickness of 6 nm on substantially the whole surface of the substrate carrying the protective filmy layer 4'. In this case, the build-up rate of the film was 0.8 nm/s.

Consequently, as shown in FIG. 8B, the protective filmy layers were combined as follows: a two-layer structure having a total thickness of 11 nm was formed of the DLC layer and the amorphous carbon layer within a disc radius of 20.7 mm, and the amorphous carbon layer having a thickness of 6 nm was present alone outside a disc radius of 20.7 mm. The thus treated substrate was taken out of the vacuum tank and allowed to cool to room temperature spontaneously.

A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The total thickness of the protective filmy layers of the disc produced in the manner described above was measured with an ellipsometer at a 0.1-mm pitch from the contact-start-and-stop (CSS) area to the area other than the CSS area, i.e., the so-called data area where the protective film did not steadily come into contact with a magnetic head. As a result, it was found that the transient area where 90% of the thickness in the CSS area, i.e., 9.9 nm, decreased to 110% of the thickness in the data area, i.e., 6.6 nm, had a length of 2.6 mm in the radial direction.

That is, as can be seen with reference to FIG. 8C, it is substantially impossible in practice to form the DLC layer in the CSS area vertically as schematically shown in FIG. 8B, in the boundary between the CSS area and the data area. Therefore, the DLC layer is laminated with a certain degree of gradient. When the difference between a disc radius R1 at a position corresponding to 90% of the thickness A in the CSS area and a disc radius R2 at a position corresponding to 110% of the thickness B in the data area (R2–R1) is employed as a numeral value indicating the laminated state at the boundary, the smaller the difference (namely, the smaller the transient area), the steeper the boundary surface. It may be safely be said that when the above-mentioned difference is less than 5, the boundary surface is steep. For assuring the strength in the CSS area, the ratio A/B is preferably 1.3 or more.

The reason why the above-mentioned indication of extent of the transient area between the CSS area and the data area was less than 5 in Embodiment 6 is that the DLC layer was formed only in the CSS area by the ion beam method. It was found that in the case of a sputtering method, ions pass around behind shields, so that the steepness of a formed film in the boundary is lower than in the case of the ion beam method.

Figure 11:
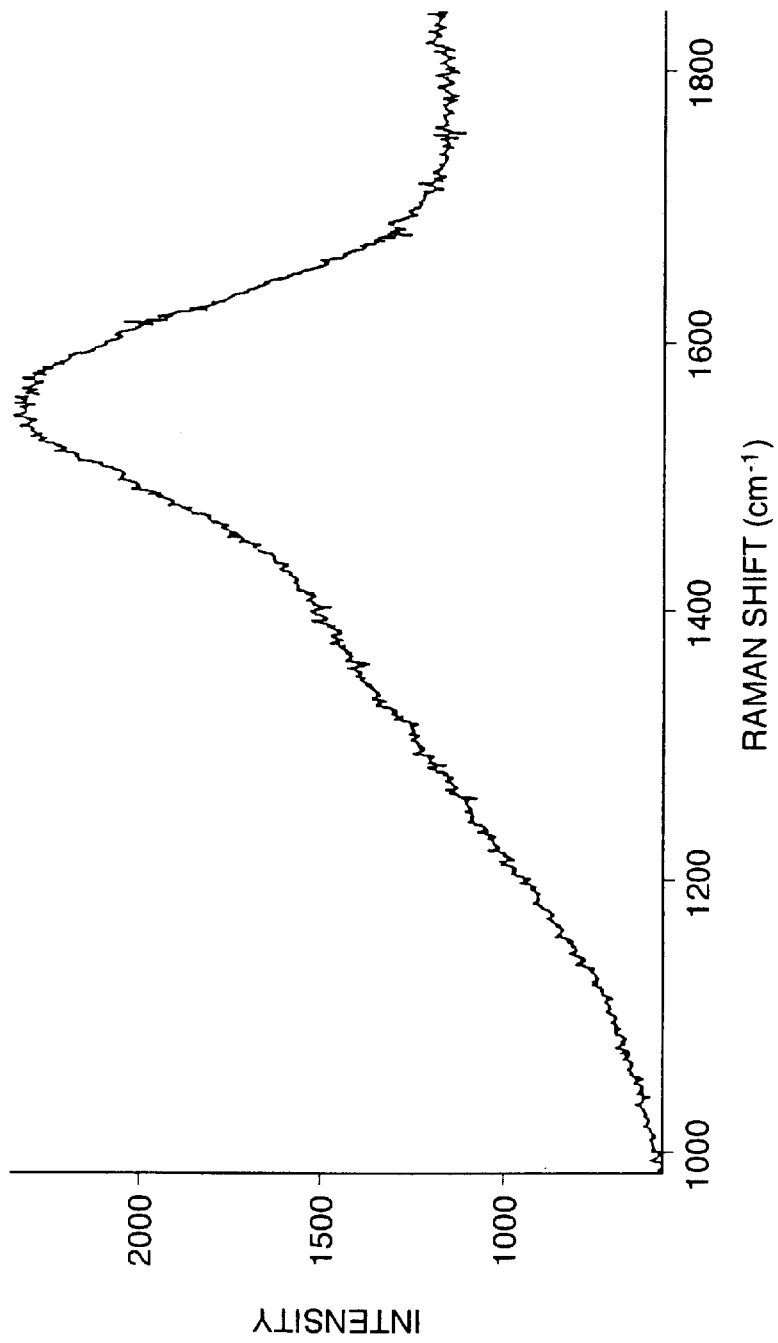
FIG. 11 is a spectrum showing the results of Raman spectroscopic analysis of a protective filmy layer formed by an ion beam deposition method according to further another embodiment of the present invention.

Raman spectroscopic analysis was carried out in order to investigate the structures of the protective filmy layers of the disc produced in the manner described above. For the sake of simplicity, there were used a disc having no protective filmy layer 4' formed thereon and a disc having no protective filmy layer 5' formed thereon. There were employed Raman spectroscopic analysis apparatus 2010 manufactured by Lennie-Shaw Co., an Ar laser (514.5 nm), and a measuring wave number of 1000 to 1800, or 1000 to 2300/cm. As a result, it could be confirmed that the protective filmy layer 4' was a typical DLC film, because as shown in FIG. 11, the protective filmy layer 4' had such characteristics that it showed only one peak near 1550 kaysers (1550 (1/cm) on the axis of abscissa in FIG. 11) and did not show a large peak near 1350 kaysers.

Figure 12:
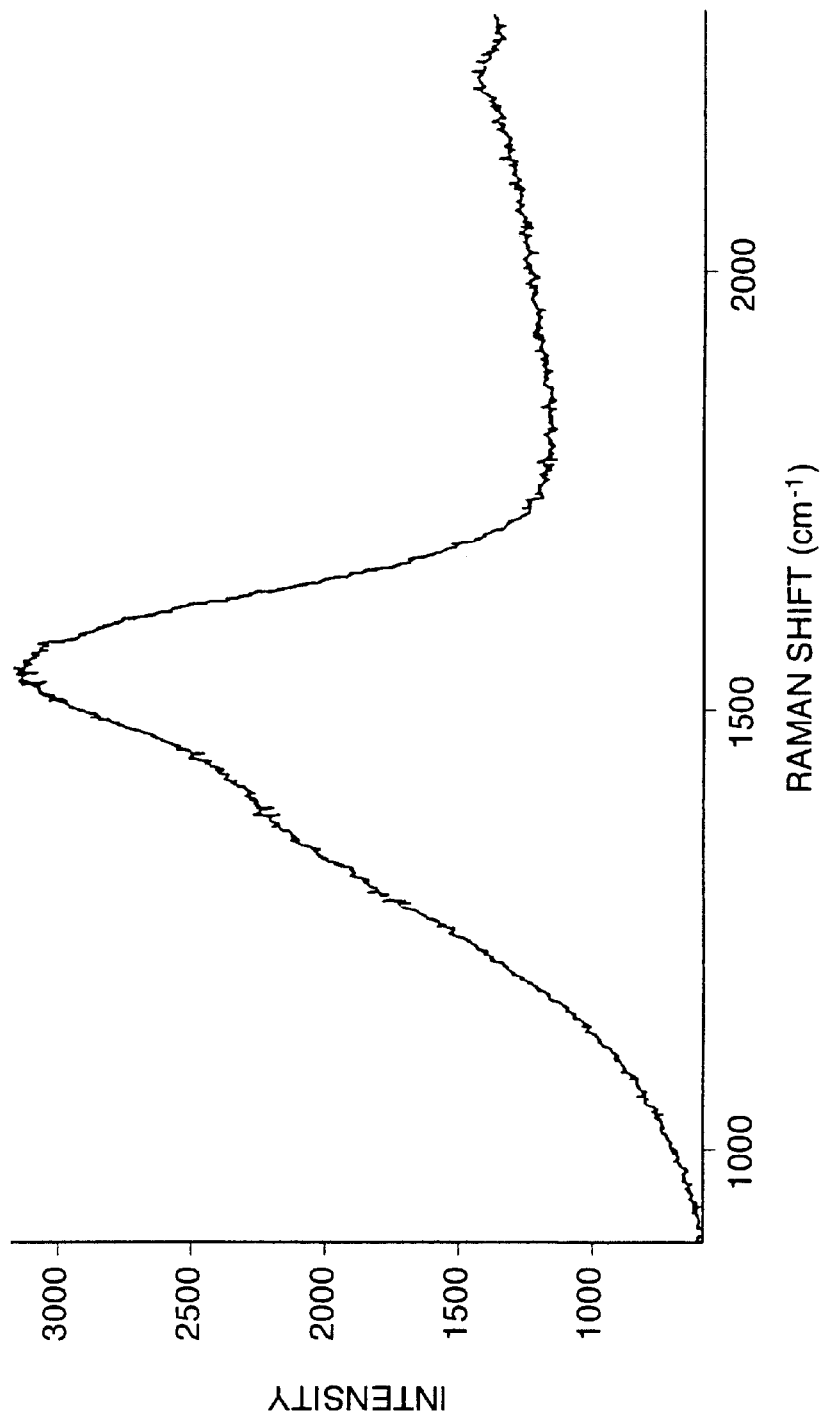
FIG. 12 is a spectrum showing the results of Raman spectroscopic analysis of a protective filmy layer formed by a sputtering method according to still another embodiment of the present invention.

As shown in FIG. 12, the protective filmy layer 5' showed a typical waveform of amorphous carbon which had a broad peak from 900 to 1800/cm, and it showed a vibration peak due to a terminal bond —C≡N for C═N in the vicinity of 2230/cm. By the fact that the background showed a gentle slope from 900 to 2300/cm, it could be confirmed that the protective filmy layer 5' was formed of amorphous carbon containing both a large amount of nitrogen and hydrogen.

On the other hand, ten of the discs also having the lubricant layer formed thereon were individually set in a contact-start-and-stop (CSS) evaluation apparatus and tested. When the 10 discs were subjected to CSS 50,000 times at a revolution rate of 7,500 r.p.m., all of the 10 discs finished the test without crash. When their surfaces after the test were carefully observed under a microscope and carefully and visually observed by oblique light, no injury was detected in the discs. Thus, it was proved that the magnetic recording medium of the present invention has a sufficient reliability on resistance to sliding when the thickness of the protective film in the area where a magnetic head performs CSS is 11 nm.

Next, 0.1 g of alumina particles having an average particle size of 0.1 μm were casted on each of the 10 discs while carrying out random seeking of a magnetic head at 7,500 r.p.m. in the area other than the area where CSS was carried out, i.e., the so-called data area (corresponding to a disc radius range of 21 mm to 46 mm) where the protective film did not steadily come into contact with the magnetic head. After 120 seconds of the seeking, the disc surface was observed under a microscope and visually observed by oblique light. As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective filmy layer in the data area is as very small as 6 nm.

Embodiment 7

A substrate 1' obtained by plating an aluminum alloy base material (outside diameter 95 mm, inside diameter 25 mm, thickness 0.8 mm) with Ni—P was textured so that Ra=2 nm and Rp=15 nm (Ra and Rp are indications of roughness). Then, projections having a height of 15 nm and a diameter of 3.5 μm were formed thereon at intervals of 10 μm by laser irradiation in the area corresponding to a disc radius range of 18.0 to 20.5 mm, and the thus treated substrate 1' was thoroughly washed.

The substrate 1' was introduced into a vacuum tank evacuated to about 5.3×10 E−5 Pa (4.0×10 E−7 Torr). First, the substrate 1' was conveyed to a heating chamber in the vacuum tank and heated to 260° C. with an IR heater (infrared heater). Then, the substrate 1' was conveyed to a primer-layer forming chamber and a Cr—10 at. % Mo—7.5 at. % Ti alloy primer layer 2' was formed thereon in a thickness of 30 nm by a DC magnetron sputtering method under an Ar atmosphere at about 0.8 Pa (6 mTorr).

Subsequently, the substrate 1' was conveyed to a magnetic-recording-layer forming chamber and a Co—20 at. % Cr—4 at. % Ta—8 at. % Pt alloy layer 3' (capable of forming a magnetic layer) was formed thereon in a thickness of 22 nm by a DC magnetron sputtering method under an Ar atmosphere at about 0.9 Pa (7 mTorr). Using this substrate having the Cr—10 at. % Mo—7.5 at. % Ti alloy primer layer 2' and Co—20 at. % Cr—4 at. % Ta—8 at. % Pt alloy layer 3' formed thereon, the following protective filmy layers composed mainly of carbon according to the present invention were formed.

As the above-mentioned substrate 1', there can be used, for example, rigid substrates made of ceramics of chemically strengthened aluminosilicate, soda-lime glass, silicon, borosilicate glass, etc. or made of glass-glazed ceramics, as well as Al—Mg alloy substrates subjected to nonelectrode plating with Ni—P.

The primer layer 2' is used as a primer film for controlling the crystalline orientation of the magnetic layer formed thereon. As the primer layer, there can also be used thin films of Cr-based alloys such as nonmagnetic Cr—V, Cr—Ti, Cr—Mo, Cr—Si and Cr—Mo—Ti alloys which form disordered solid solutions capable of being subjected to (100) orientation good in crystal matching with the magnetic layer. When the primer layer was formed by adding 0.5 vol % to 50 vol % of nitrogen to a gas for discharge used in the sputtering, the refinement of grains of the primer layer took place. Consequently, grains of the magnetic layer subsequently formed were also refined, so that medium noise could be reduced.

As the magnetic layer 3', there can be used not only Co—Cr—Ta—Pt alloys but also multi-component alloy systems which are composed mainly of Co, contain Pt for increasing the coercive force and contain Cr, Ta, $SiO_2$, Nb, etc. for reducing medium noise. Particularly when Ta, Nb, V or Ti was added, the melting point of a target was lowered, so that the progress of component separation of the magnetic layer containing Cr was desirably facilitated.

Co-based alloy systems containing Pt, Ni or Mn are practical because their anisotropy energy does not decrease so much as that of Co-based alloy systems containing any other additive element. Specifically, there can be used alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$, etc., as well as Co—Cr—Pt. As to the composition of the Co alloy layer constituting the ferromagnetic portion, the amount of Cr incorporated as a solid solution is considered to be 5 to 10 at. % and the amount of Ta incorporated as a solid solution about 2 at. %. When the Co alloy magnetic layer is formed by incorporating Cr and Ta in amounts larger than the above amounts, magnetic separation in the magnetic layer proceeds, resulting in reduced medium noise.

As a practical composition, there can be used, for example,

Co—20 at. % Cr—4 at. % Ta—8 at. % Pt alloy,
Co—22 at. % Cr—20 at. % Pt alloy,
Co—15 at. % Cr—8 at. % Pt—20 mol. % $SiO_2$ alloy,
Co—17 at. % Cr—12 at. % Pt—5 at. % Mn alloy,
Co—17 at. % Cr—5 at. % Nb—10 at. % Pt alloy,
Co—20 at. % Cr—5 at. % V—12 at. % Pt alloy,
Co—20 at. % Cr—10 at. % V—15 at. % Pt alloy, and
Co—15 at. % Cr—5 at. % Nb—5 at. % Ta—20 at. % Pt alloy.

Figure 10:
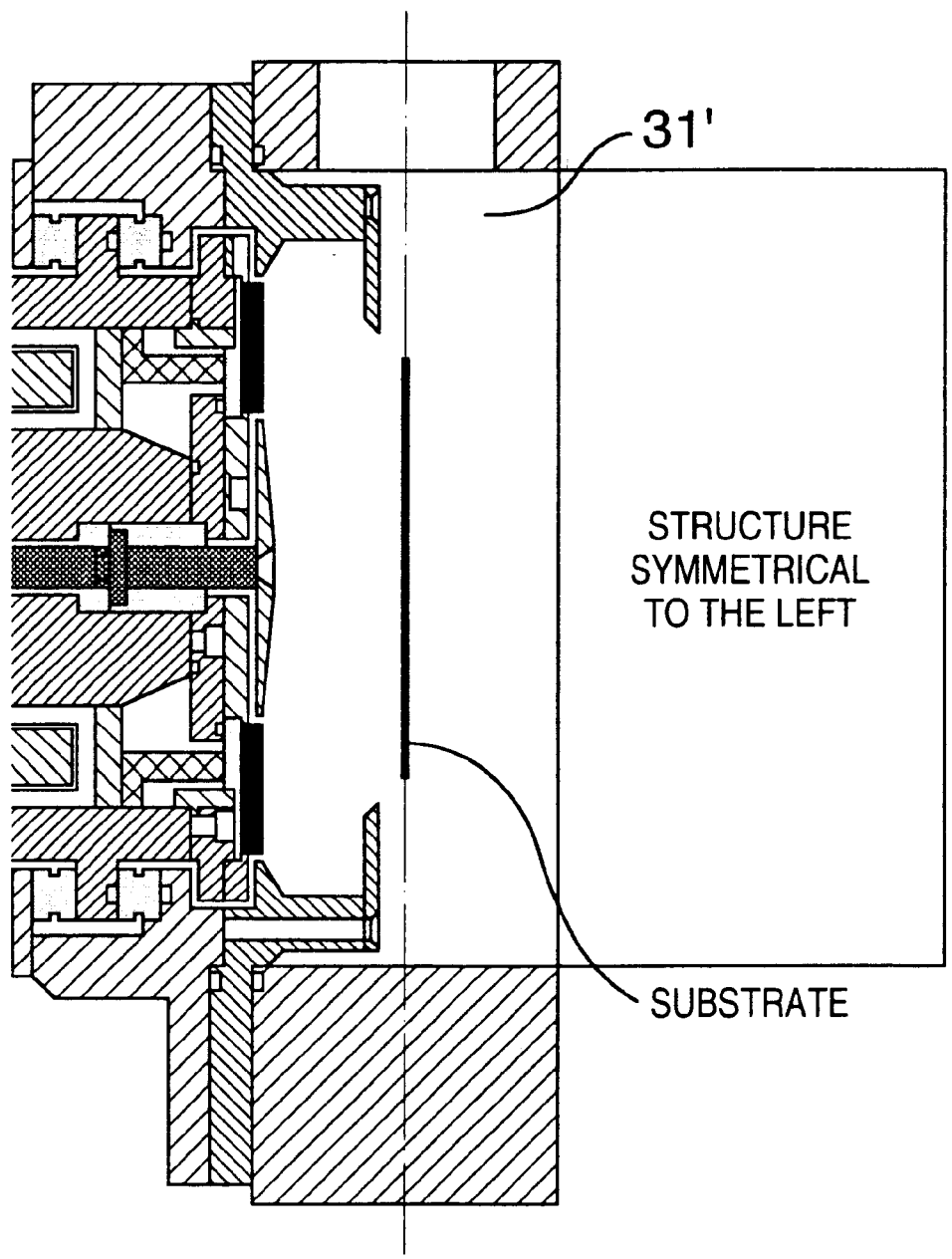
FIG. 10 is a schematic illustration of a protective-film forming chamber 31'.

The above-mentioned substrate was conveyed to the protective-filmy-layer forming chamber 31' shown in FIG. 10, i.e., a chamber for forming a protective filmy layer by a sputtering method, without taking out the substrate from the vacuum tank. Ar gas containing 30% $N_2$ and 6.0% $H_2$ was introduced into the chamber 31' at a rate of 24 sccm through a mass flow controller while evacuating the protective-filmy-layer forming chamber 31' with a turbo molecular pump. In this case, the pressure was about 1 Pa (8 mTorr) as measured with a Baratron gauge. Then, DC 1000 W was applied to graphite sintering targets fixed on cathodes located on both sides of the substrate, to induce plasma. In this case, the discharge current was about 1.5 A and the discharge voltage about 670 V. By this so-called reactive sputtering method, an amorphous carbon protective filmy layer 5' composed mainly of carbon and nitrogen and containing hydrogen was formed in a thickness of 6 nm on the Co—Cr—Ta—Pt alloy layer 3' all over the CSS area and the data area. In this case, the build-up rate of the film was 0.8 nm/s.

Figure 9:
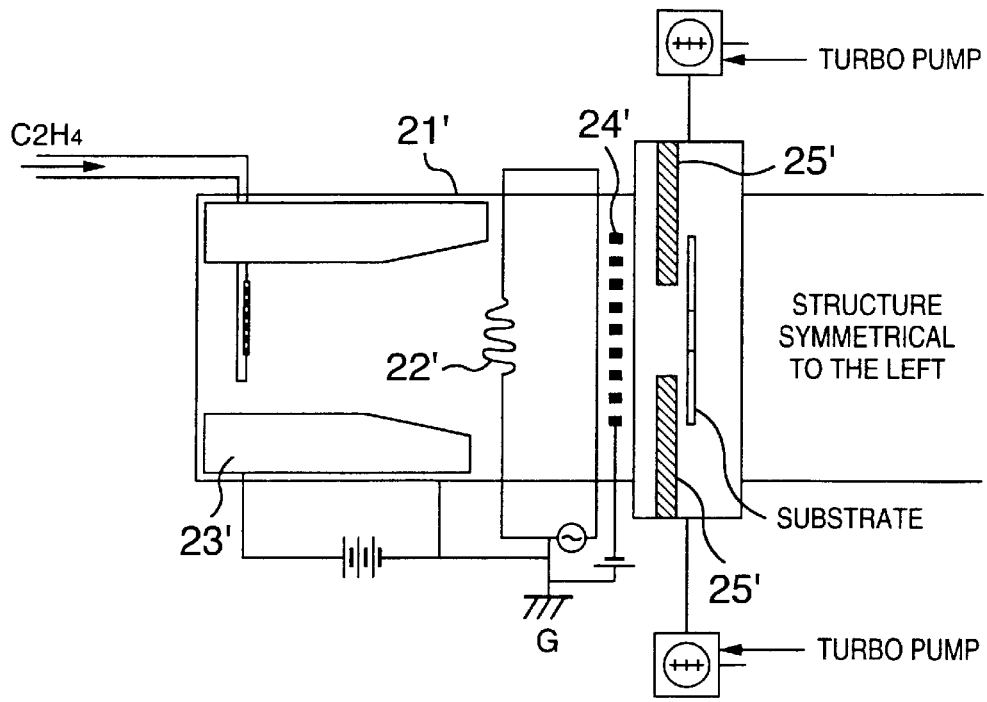
FIG. 9 is a schematic illustration of a protective-film forming chamber 21'.

Next, the thus treated substrate was conveyed to the protective-filmy-layer forming chamber 21' shown in FIG. 9, i.e., a chamber for forming a protective filmy layer by an ion beam method. The protective-filmy-layer forming chamber 21' comprises ion guns consisting of a hot filament 22', an anode 23' and a grid 24' located in front of the hot filament. The protective-filmy-layer forming chamber 21' is also equipped with the shields against deposited particles 25' shown in FIG. 9, so as to have such a structure that a film is actively built up only in the whole area within a disc radius of 20.7 mm on the substrate where a magnetic head comes into contact with a protective film to be formed, at the time of starting and/or standing of the magnetic head and that build-up of a film is very difficult outside a disc radius of 20.7 mm. From behind the anode, Ar gas and ethylene ($C_2H_4$) gas were introduced into the chamber 21', each at a rate of 15 sccm, through a mass flow controller while evacuating the protective-filmy-layer forming chamber 21' with a turbo molecular pump. In this case, the pressure was about 0.5 Pa (4 mTorr) as measured with a Baratron gauge.

Then, plasma was induced by applying 350 mA and direct current +120 V to the hot filament and anode, respectively, of each of the ion guns located on both sides of the substrate. Ions were extracted by applying −530 V to the grids. Further, a pulse bias of −80 V and 3 kHz was applied to the substrate. In this case, the anode current was 500 mA and the bias current of the substrate was 120 mA. By this so-called ion beam deposition method (IBD), a DLC protective filmy layer 4' composed mainly of carbon and hydrogen was formed in a thickness of 5 nm within a disc radius of 20.7 mm on the protective filmy layer 5'. Thus, on the inner-periphery side of the disc, i.e., the CSS area, the amorphous carbon protective filmy layer 5' was formed on the magnetic layer and the DLC layer 4' was formed on the protective filmy layer 5'. In this case, the build-up rate of the film was 1.0 nm/s. Consequently, the protective filmy layers were combined as follows: a two-layer structure having a total thickness of 11 nm was formed of the amorphous carbon layer and the DLC layer within a disc radius of 20.7 mm, and the amorphous carbon layer having a thickness of 6 nm was present alone outside a disc radius of 20.7 mm. The thus treated substrate was taken out of the vacuum tank and allowed to cool to room temperature spontaneously.

A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The total thickness of the protective filmy layers of the disc produced in the manner described above was measured with an ellipsometer at a 0.1-mm pitch from the contact-start-and-stop (CSS) area to the area other than the CSS area, i.e., the so-called data area where the protective film did not steadily come into contact with a magnetic head. As a result, it was found that the transient area where 90% of the thickness in the CSS area, i.e., 9.9 nm, decreased to 110% of the thickness in the data area, i.e., 6.6 nm, had a length of 2.4 mm in the radial direction.

Raman spectroscopic analysis was carried out in order to investigate the structures of the protective filmy layers of the disc produced in the manner described above. For the sake of simplicity, there were used a disc having no protective filmy layer 4' formed thereon and a disc having no protective filmy layer 5' formed thereon. There were employed Raman spectroscopic analysis apparatus 2010 manufactured by Lennie-Shaw Co., an Ar laser (514.5 nm), and a measuring wave number of 1000 to 1800, or 1000 to 2300/cm.

As a result, it could be confirmed that the protective filmy layer 4' was a typical DLC film, because as shown in FIG. 11, the protective filmy layer 4' had such characteristics that it showed only one peak near 1550 kaysers (1550 (1/cm) on the axis of abscissa in FIG. 11) and did not show a large peak near 1350 kaysers.

As shown in FIG. 12, the protective filmy layer 5' showed a typical waveform of amorphous carbon which had a broad peak from 900 to 1800/cm, and it showed a vibration peak due to a terminal bond —C≡N for C=N in the vicinity of 2230/cm. By the fact that the background showed a gentle slope from 900 to 2300/cm, it could be confirmed that the protective filmy layer 5' was formed of amorphous carbon containing both a large amount of nitrogen and hydrogen.

On the other hand, ten of the discs also having the lubricant layer formed thereon were individually set in a contact-start-and-stop (CSS) evaluation apparatus and tested. When the 10 discs were subjected to CSS 50,000 times at a revolution rate of 7,500 r.p.m., all of the 10 discs finished the test without crash. When their surfaces after the test were carefully observed under a microscope and carefully and visually observed by oblique light, no injury was detected in the discs. Thus, it was proved that the magnetic recording medium of the present invention has a sufficient reliability on resistance to sliding when the thickness of the protective film in the area where a magnetic head performs CSS is 11 nm.

Next, 0.1 g of alumina particles having an average particle size of 0.1 μm were casted on each of the 10 discs while carrying out random seeking of a magnetic head at 7,500 r.p.m. in the area other than the area where CSS was carried out, i.e., the so-called data area (corresponding to a disc radius range of 21 mm to 46 mm) where the protective film did not steadily come into contact with the magnetic head. After 120 seconds of the seeking, the disc surface was observed under a microscope and visually observed by oblique light. As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective filmy layer in the data area is as very small as 6 nm.

COMPARATIVE EXAMPLE 10

Discs were produced by substantially the same process as in Embodiment 6 except that no DLC protective filmy layer 4' was formed. That is, substantially the whole surface of each disc had only an amorphous carbon protective filmy layer 5' as a protector. Ten discs also having a lubricant layer formed thereon were individually set in a (CSS) evaluation apparatus and tested in the same manner as in Embodiment 6. As a results, all of the 10 discs underwent crash owing to less than 1,000 runs of CSS. In addition, when 10 other discs also having a lubricant layer formed thereon were subjected to a seek test and surface observation in the same manner as in Embodiment 6, the surface of the protective film of each disc received some very slight scratches, though so-called crash accompanying the fracture of the protective film did not occur. Thus, it turned out that the disc produced according to Comparative Example 10 has a sufficient reliability on resistance to sliding in the data area but cannot have a sufficient reliability on resistance to sliding in the area where CSS is carried out.

COMPARATIVE EXAMPLE 11

No amorphous carbon protective filmy layer 5' was formed and no shield against deposited particles was used for forming a DLC protective filmy layer 4'. Thus, substantially the whole surface of each disc was covered with the DLC protective film. In this case, the protective filmy layer 4' was formed in a thickness of 5 nm. Except for the above, discs were produced by substantially the same process as in Embodiment 6. Ten discs also having a lubricant layer formed thereon were individually set in a (CSS) evaluation apparatus and tested in the same manner as in Embodiment 6.

As a result, all of the 10 discs underwent crash owing to less than 7,000 runs of CSS. In addition, when 10 other discs also having a lubricant layer formed thereon were subjected to a seek test and surface observation in the same manner as in Embodiment 6, the surface of the protective film of each disc received some very slight scratches, though so-called crash accompanying the fracture of the protective film did not occur. Thus, it turned out that the disc produced according to Comparative Example 11 has a sufficient reliability on resistance to sliding in the data area but cannot have a sufficient reliability on resistance to sliding in the area where CSS is carried out.

COMPARATIVE EXAMPLE 12

A chamber comprising the same guns for sputtering as those of the protective-filmy-layer forming chamber 31' was used as the protective-filmy-layer forming chamber 21'. The shields were not removed in order that the adhesion of sputtering particles might be difficult outside a disc radius of 20.7 mm. When a protective filmy layer 4' was formed in the protective-filmy-layer forming chamber 21', Ar gas containing 30% $N_2$ and 6.0% $H_2$ was introduced into the chamber 21' at a rate of 24 sccm through a mass flow controller. In this case, the pressure was about 1.0 Pa (8.0 mTorr) as measured with a Baratron gauge.

Then, DC 1000 W was applied to graphite sintering targets fixed on cathodes located on both sides of the substrate, to induce plasma. In this case, the discharge current was about 1.5 A and the discharge voltage about 670 V. By this so-called reactive sputtering method, the protective filmy layer 4' composed mainly of carbon and nitrogen and containing a large amount of hydrogen was formed in a thickness of 5 nm within a disc radius of 20.7 mm on a Co—Cr—Ta—Pt alloy layer 3'. In this case, the build-up rate of the film was 0.8 nm/s. Except for the above process for forming the protective filmy layer 4', discs were produced by substantially the same process as in Example 6.

The total thickness of the protective filmy layers of the disc produced in the manner described above was measured with an ellipsometer at a 0.1-mm pitch from the contact-start-and-stop (CSS) area to the area other than the CSS area, i.e., the so-called data area where the protective film did not steadily come into contact with a magnetic head. As a result, it was found that the transient area where 90% of the thickness in the CSS area, i.e., 9.9 nm, decreased to 110% of the thickness in the data area, i.e., 6.6 nm, had a length of 8.7 mm in the radial direction.

Thus, the following was found: when the reactive sputtering method is used for forming the protective filmy layer 4', the film thickness cannot be abruptly increased as that in the CSS area in a short distance even by the use of the same shields as used in the ion beam deposition method, so that it is impossible to assure the uniformity of the film thickness in the data area and assure the film thickness in the CSS are as desired. Ten discs also having a lubricant layer formed thereon were individually set in a (CSS) evaluation apparatus and tested in the same manner as in Embodiment 6.

As a results, all of the 10 discs underwent crash owing to less than 25,000 runs of CSS. In addition, when 10 other discs also having a lubricant layer formed thereon were subjected to a seek test and surface observation in the same manner as in Embodiment 6, the surface of the protective film of each disc received some very slight scratches, though so-called crash accompanying the fracture of the protective film did not occur. Thus, it turned out that the disc produced according to Comparative Example 12 has a sufficient reliability on resistance to sliding in the data area but cannot have a sufficient reliability on resistance to sliding in the area where CSS is carried out.

Embodiment 8

The same discs as described in each of Embodiments 1 to 7 were subjected to 50,000 runs of the CSS sliding resistance test to find that in the case of all magnetic recording media having a magnetic film of 15 nm, 17 nm or 21 nm in thickness, neither the magnetic recording madia nor a magnetic head were destroyed, namely, a satisfactory reliability on resistance to sliding could be attained.

When the thickness of the magnetic layer was reduced, the product of the thickness t of the magnetic layer and the residual magnetic flux density Br, Br×t is markedly reduced. The in-plane coercive force Hc was approximately 176 kA/m to 256 kA/m, the coercive force squareness ratio S* was about 0.7 (in a range of 0.74 to 0.65), and the squareness ratio S was 0.78 to 0.7. These magnetic characteristics were measured at 25° C. with a sample vibration type magnetometer.

The electromagnetic transduction characteristics of the above-mentioned magnetic recording media were measured by using a magnetic head having a shield gap length Gs of magnetoresistance effect type reproducing element (MR element) of 0.18 $\mu$m and a gap length of writing element of 0.3 $\mu$m . The sense current of the MR element was adjusted to 6 mA and the writing current Iw to 41 mA. The output half-value width PW 50 of solitary regenerative wave was measured with a digital oscilloscope (Tektronix TDS544A) by varying the revolution rate of each magnetic recording medium (each magnetic disc medium) and the degree of lifting of the head. The thinner the magnetic film and the lower the degree of lifting of the magnetic head, the smaller the value of PW 50. A small PW 50 value of 240 nm was obtained when the thickness of the magnetic film was 15 nm and the degree of lifting of the head was 25 nm.

The output at a maximum line packing density 360 kFCI which had been measured with a spectrum analyzer was 1 to 2% based on the output of solitary regenerative wave at 10 kFCI which had been measured with the digital oscilloscope. This output at a maximum line packing density 360 kFCI measured with a spectrum analyzer was a value obtained by adding up the outputs of waveforms in odd numbers until the frequency exceeded 100 MHz. In addition, the ratio of the O-p output of solitary regenerative wave (SLF) to integrated medium noise (Nd) in the case of recording signals at 360 kFCL, SLF/Nd was estimated. In this case, the degree of lifting of the head was adjusted to 25 nm and Nd was a value obtained by integrating noise in a zone corresponding to a range of 0.5 kFCI to 540 kFCI. For all the media, a high SLF/Nd ratio of 24 dB or more was obtained at a high packing density of 360 kFCI.

Figure 4:
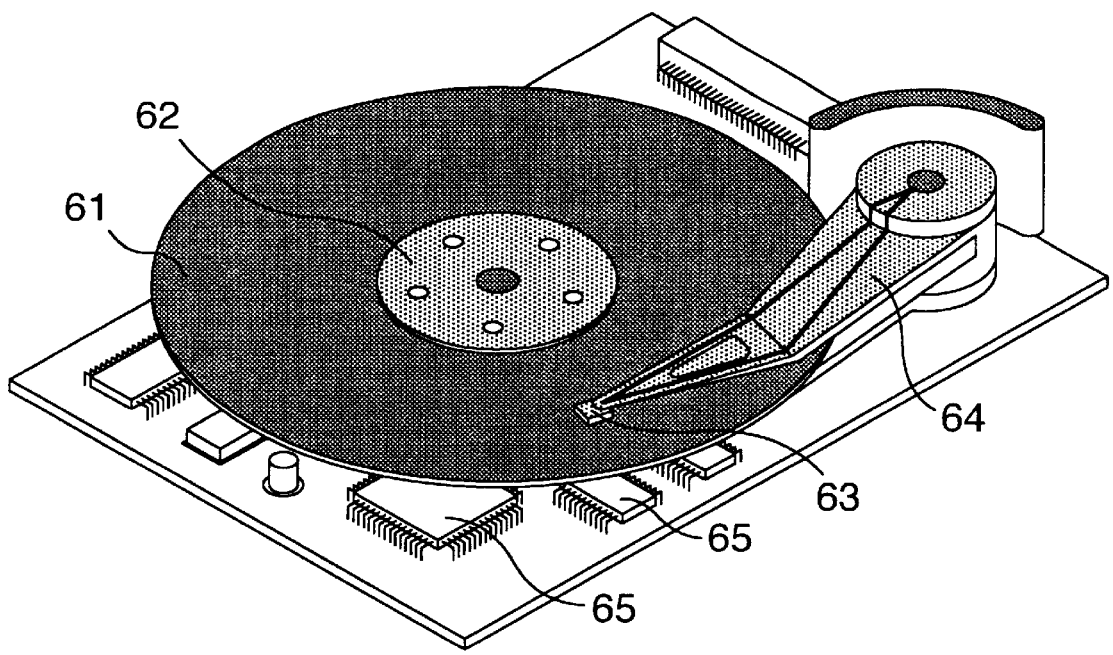
FIG. 4 is a diagram showing the whole structure of a magnetic storage.

As shown in FIG. 4, there was constructed a magnetic storage comprising each of the above-mentioned magnetic disc media 61, a driving unit 62 for driving said magnetic recording medium, a magnetic head composed of a recording portion and reproducing portion, a means 64 for moving said magnetic head in relation to said magnetic recording medium, and means 65, i.e., a means for inputting signals into said magnetic head and a record reproduction signal processing means for reproducing signals outputted from said magnetic head.

Figure 5:
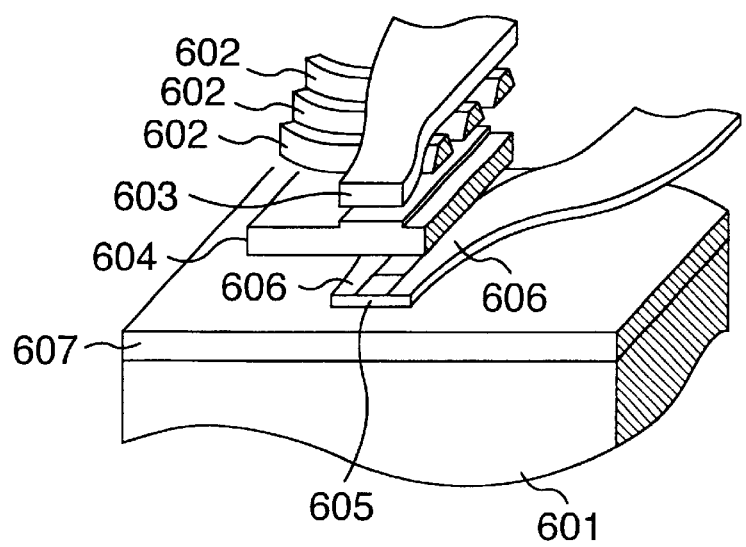
FIG. 5 is a schematic perspective view of a magnetic head.

FIG. 5 is a schematic perspective view of the above-mentioned magnetic head used for the measurement whose reproducing portion is composed of a magnetoresistance effect type magnetic head. Said head is a composite head having both an electromagnetic induction type head for recording and the magnetoresistance effect type magnetic head for reproduction which are formed on a base 601. Said head for recording is composed of an upper recording magnetic pole 603 and a lower recording magnetic pole and upper shield layer 604 which hold a coil 602 between them. The gap length between the recording magnetic poles was adjusted to 0.3 Am. A copper wire of 3 $\mu$m thick was used as the coil. Said head for reproduction is composed of a magnetoresistance sensor 605 and electrode patterns 606 located on both sides of the magnetoresistance sensor 605. The magnetoresistance sensor is held between the lower recording magnetic pole and upper shield layer 604 and a lower shield layer 607, both of which have a thickness of 1 $\mu$m. The distance between said shield layers is 0.2 $\mu$m. In FIG. 5, a gap layer between the recording magnetic poles and gap layers between each shield layer and the magnetoresistance sensor are omitted.

Figure 6:
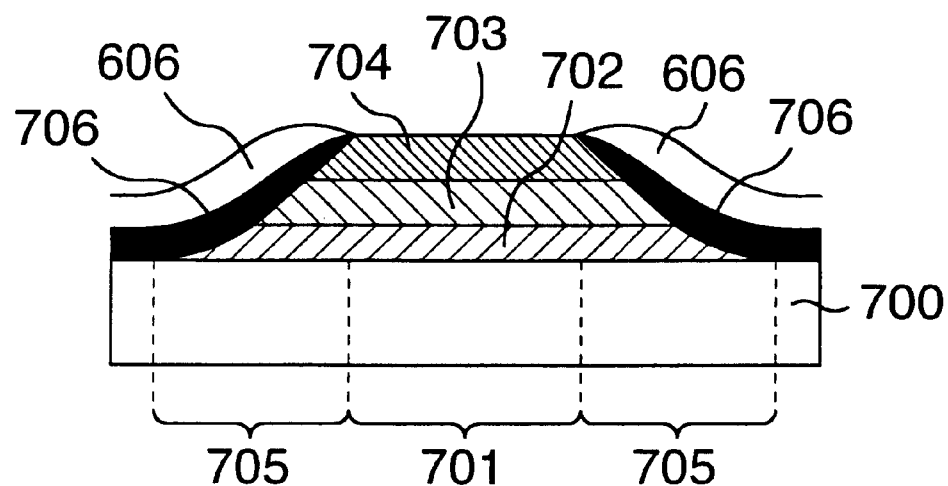
FIG. 6 is a diagram showing the structure of a section of a magnetoresistance sensor.

FIG. 6 shows the structure of a section of the magnetoresistance sensor. The signal detection region 701 of the magnetic sensor is composed of a portion obtained by forming a lateral bias layer 702, a separating layer 703 and a magnetoresistance ferromagnetic layer 704 in that order on a gap layer 700 of aluminum oxide. A Ni—Fe alloy layer of 20 nm thick was used as the magnetoresistance ferromagnetic layer 704. Although a Ni—Fe—Nb alloy layer of 25 nm thick was used as the lateral bias layer 702, any other ferromagnetic alloy having a relatively high electric resistance and good soft-magnetic characteristics, such as Ni—Fe—Rh may also be used. The lateral bias layer 702 is magnetized in a film in-plane direction (a lateral direction) perpendicular to a sense current flowing through the magnetoresistance ferromagnetic layer 704, by a magnetic field generated by said current, and applies a lateral bias magnetic field to the magnetoresistance ferromagnetic layer 704. A magnetic sensor capable of thus exhibiting a linear reproduction output for a magnetic field leaking out of the media 61 is chosen. Ta having a relatively high electric resistance was used in the separating layer 703 for preventing the diversion of a sense current from the magnetoresistance ferromagnetic layer 704, and the thickness of the separating layer 703 was adjusted to 5 nm.

A tapered portion 705 formed by tapering is present on each side of the signal detection region. The tapered portion 705 is composed of a permanent-magnet layer 706 for making the magnetoresistance ferromagnetic layer 704 into a single domain, and a pair of electrodes formed thereon for taking out signals. The permanent-magnet layer 706 has to have a large coercive force and its direction of magnetization must not be easily changed. Any of alloys such as Co—Cr, Co—Cr—Pt, etc. is used in the permanent-magnet layer 706.

The magnetic storage shown in FIG. 4 was constructed by combining the magnetic recording medium described in each of Embodiments 1 to 7 with the above-mentioned head shown in FIG. 5. As a result, in the case of a lifting system with a magnetic lifting altitude hm of approximately 48–60 nm, when the product of the thickness t of the magnetic layer and the residual magnetic flux density Br measured by applying a magnetic field in the direction of traveling of said magnetic head in relation to said magnetic recording medium during recording, Br×t was more than 9.6 mA (120 gauss·micron), sufficient writing was impossible, overwriting characteristics were deteriorated, and the output particularly in a high line packing density region is decreased.

On the other hand, when Br×t was less than 3.2 mA (40 gauss·micron), the reproduction output was decreased in some cases by standing at 70° C. for 4 days, depending on the composition or thickness of the recording layer of the medium. Therefore, the magnetic storage was constructed so that the product of the thickness t of the magnetic layer described for the magnetic recording medium described in each of Embodiments 1 to 7 and the residual magnetic flux density Br measured by applying a magnetic field in the direction of traveling of said magnetic head in relation to said magnetic recording medium during recording, Br×t might be not more than 9.6 mA (120 gauss·micron) and not less than 3.2 mA (40 gauss·micron).

When there was used a head wherein the magnetoresistance sensor portion of the above-mentioned magnetoresistance effect type magnetic head had been formed between two shield layers made of a soft magnetic material and located at a distance of more than 0.2 $\mu$m from each other, no sufficient reproduction output could be obtained when the maximum line packing density was more than 250 kFCI. When the distance between the two shield layers made of a soft magnetic material was less than 0.12 $\mu$m, an element could not easily be formed because of difficulty in processing. In view of these results, the magnetic storage was constructed by using a head wherein the magnetoresistance sensor portion had been formed between two shield layers made of a soft magnetic material and located at a distance of not more than 0.2 $\mu$m and not less than 0.12 $\mu$m from each other. By the use of thus constructed magnetic storage, a packing density of 5 gigabits or more per square inch could be attained.

Embodiment 9

A magnetic storage was constructed by employing the same structure as shown in FIG. 4, except that in place of the magnetoresistance effect type magnetic head used in Embodiment 8, there was used the same magnetoresistance effect type magnetic head 63 as described in Embodiment 8 except that it comprised a magnetoresistance sensor comprising a plurality of electroconductive magnetic layers capable of causing a marked resistance change owing to relative changes of their mutual directions of magnetization caused by an external magnetic field, and electroconductive nonmagnetic layers located among the electroconductive magnetic layers.

Figure 7:
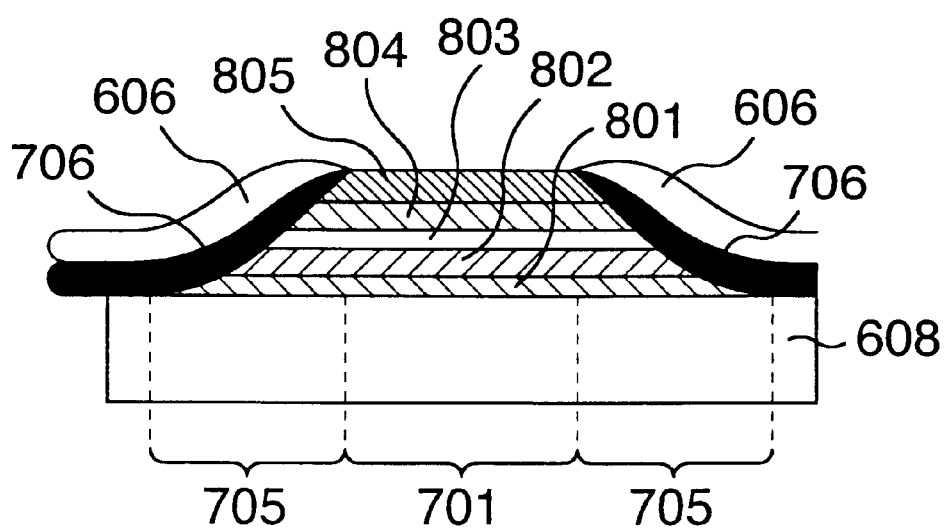
FIG. 7 is a cross-sectional view of a sensor using a spin valve type magnetic head.

FIG. 7 is a cross-sectional view of the sensor used. The structure of this sensor is such that on a gap layer 608, a Ta buffer layer 801 of 5 nm thick, a first magnetic layer 802 of 7 nm thick, an intermediate copper layer 803 of 1.5 nm thick, a second magnetic layer 804 of 3 nm thick, and a Fe—50 at. % Mn antiferromagnetic alloy layer 805 of 10 nm thick are formed in that order. Ni—20 at % Fe alloy was used in said first magnetic layer and cobalt was used in the second magnetic layer 804. The magnetization of the second magnetic layer 804 is fixed in one direction by an exchange magnetic field from the antiferromagnetic layer 805. On the other hand, the direction of magnetization of first magnetic layer 802 contacting the second magnetic layer 804 through the nonmagnetic layer 803 is changed by a magnetic field leaking out of the magnetic recording medium 61, so that a resistance change is caused.

Such a resistance change accompanying the changes of relative directions of magnetization of the two magnetic layers is called "spin valve effect". In the present embodiment, a spin valve type magnetic head utilizing this effect was used as the head for reproduction. The tapered portion 705 has the same structure as in the magnetic sensor used in Embodiment 8.

Br×t of magnetic recording media used for measurement was adjusted to 3, 3.2, 4, 6, 8, 10, 12 or 14 mA. When Br×t was adjusted to 3 mA (37.5 gauss·micron), reproduction signals were remarkably decreased with the lapse of time and it was difficult to obtain a practically desirable coercive force. It became clear that when Br×t was more than 12 mA (150 gauss·micron), the tendency of the output resolving power to lowering becomes remarkable undesirably though the output of 2 F was large.

When such a spin valve type reproducing head was used, a signal output could be obtained by stable reproduction of signals recorded at a maximum line packing density of more than 360 kFCI, as described in Embodiment 8.

The head described above was the same as used in Embodiment 8. In the head, the magnetoresistance effect type magnetic head was formed on a magnetic head slider having an area of lifting surface rail of 1.4 $mm^2$ or less and a mass of 2 mg or less. The reason why the area of lifting surface rail is 1.4 $mm^2$ or less is that the probability of collision with the above-mentioned projections is reduced and that at the same time the reliability on impact resistance can be improved by adjusting the mass to 2 mg or less. Thus, both a high packing density and a high impact resistance could be attained, and a mean time between failures (MTBF) of 300,000 hours or more can be could be attained at a packing density of 5 gigabits or more per square inch.

Embodiment 10

A substrate 1' obtained by plating an aluminum alloy base material (outside diameter 95 mm, inside diameter 25 mm, thickness 0.8 mm) with Ni—P was textured so that Ra=2 nm and Rp=15 nm (Ra and Rp are indications of roughness), and then it was thoroughly washed. The thus treated substrate 1' was introduced into a vacuum tank evacuated to about 5.3×10 E–5 Pa (4.0×10 E–7 Torr). First, the substrate 1' was conveyed to a heating chamber in the vacuum tank and heated to 260° C. with an IR heater (infrared heater).

Then, the substrate 1' was conveyed to a primer-layer forming chamber and a Cr—10 at. % Mo—7.5 at. % Ti alloy primer layer 2' was formed thereon in a thickness of 30 nm by a DC magnetron sputtering method under an Ar atmosphere at about 0.8 Pa (6 mTorr). Subsequently, the substrate 1' was conveyed to a magnetic-recording-layer forming chamber and a Co—20 at. % Cr—4 at. % Ta—8 at. % Pt alloy layer 3' (capable of forming a magnetic layer) was formed thereon in a thickness of 22 nm by a DC magnetron sputtering method under an Ar atmosphere at about 0.9 Pa (7 mTorr).

Using this substrate having the Cr—10 at. % Mo—7.5 at. % Ti alloy primer layer 2' and Co—20 at. % Cr—4 at. % Ta—8 at. % Pt alloy layer 3' formed thereon, the following protective filmy layers composed mainly of carbon according to the present invention were formed.

As the above-mentioned substrate 1', there can be used, for example, rigid substrates made of ceramics of chemically strengthened aluminosilicate, soda-lime glass, silicon, borosilicate glass, etc. or made of glass-glazed ceramics, as well as Al—Mg alloy substrates subjected to nonelectrode plating with Ni—P.

The primer layer 2' is used as a primer film for controlling the crystalline orientation of the magnetic layer formed thereon. As the primer layer, there can also e used thin films of Cr-based alloys such as nonmagnetic Cr—V, Cr—Ti, Cr—Mo, Cr—Si and Cr—Mo—Ti alloys which form disordered solid solutions capable of being subjected to (100) orientation good in crystal matching with the magnetic layer. When the primer layer was formed by adding 0.5 vol % to 50 vol % of nitrogen to a gas for discharge used in the sputtering, the refinement of grains of the primer layer took place. Consequently, grains of the magnetic layer subsequently formed were also refined, so that medium noise could be reduced.

As the magnetic layer 3', there can be used not only Co—Cr—Ta—Pt alloys but also multi-component alloy systems which are composed mainly of Co, contain Pt for increasing the coercive force and contain Cr, Ta, $SiO_2$, Nb, etc. for reducing medium noise. Particularly when Ta, Nb, V or Ti was added, the melting point of a target was lowered, so that the progress of component separation of the magnetic layer containing Cr was desirably facilitated.

Co-based alloy systems containing Pt, Ni or Mn are practical because their anisotropy energy does not decrease so much as that of Co-based alloy systems containing any other additive element. Specifically, there can be used alloys such as Co—Cr—Pt—Ta, Co—Cr—Pt—$SiO_2$, Co—Cr—Pt—Mn, Co—Cr—Nb—Pt, Co—Cr—V—Pt, Co—Cr—Ti—Pt, Co—Cr—Nb—Ta—Pt, Co—Pt—Ni—$SiO_2$, etc., as well as Co—Cr—Pt. As to the composition of the Co alloy layer constituting the ferromagnetic portion, the amount of Cr incorporated as a solid solution is considered to be 5 to 10 at. % and the amount of Ta incorporated as a solid solution about 2 at. %. When the Co alloy magnetic layer is formed by incorporating Cr and Ta in amounts larger than the above amounts, magnetic separation in the magnetic layer proceeds, resulting in reduced medium noise.

As a practical composition, there can be used, for example,

Co—20 at. % Cr—4 at. % Ta—8 at. % Pt alloy,
Co—22 at. % Cr—20 at. % Pt alloy,
Co—15 at. % Cr—8 at. % Pt—20 mol. % $SiO_2$ alloy,
Co—17 at. % Cr—12 at. % Pt—5 at. % Mn alloy,
Co—17 at. % Cr—5 at. % Nb—10 at. % Pt alloy,
Co—20 at. % Cr—5 at. % V—12 at. % Pt alloy,
Co—20 at. % Cr—10 at. % V—15 at. % Pt alloy, and
Co—15 at. % Cr—5 at. % Nb—5 at. % Ta—20 at. % Pt alloy.

The above-mentioned substrate was conveyed to the protective-filmy-layer forming chamber 31' shown in FIG. 10, without taking out the substrate from the vacuum tank. Ar gas containing 30% $N_2$ and 6.0% $H_2$ was introduced into the chamber 31' at a rate of 24 sccm through a mass flow controller while evacuating the protective-filmy-layer forming chamber 31' with a turbo molecular pump. In this case, the pressure was about 1 Pa (8 mTorr) as measured with a Baratron gauge.

Then, DC 1000 W was applied to graphite sintering targets fixed on cathodes located on both sides of the substrate, to induce plasma. In this case, the discharge current was about 1.5 A and the discharge voltage about 670 V. By this so-called reactive sputtering method, an amorphous carbon protective filmy layer 5' composed mainly of carbon and nitrogen and containing hydrogen was formed in a thickness of 6 nm on the Co—Cr—Ta—Pt alloy layer 3'. In this case, the build-up rate of the film was 0.8 nm/s.

Figure 13:
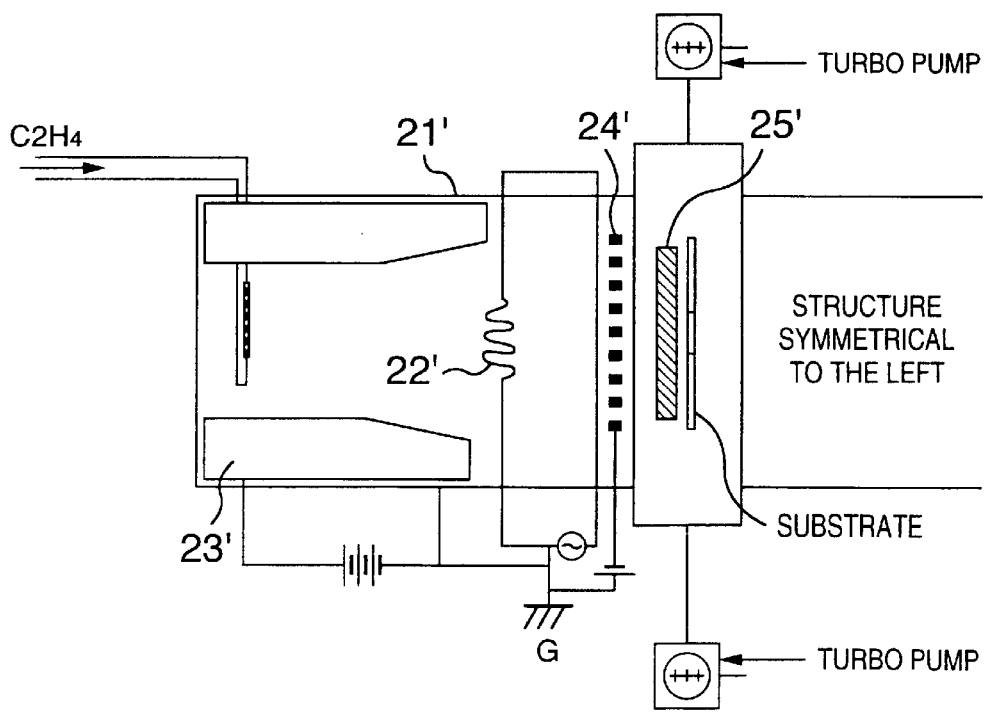
FIG. 13 is a schematic illustration of a protective-film forming chamber 21' for forming a film on the periphery side of a magnetic recording medium.

Next, the thus treated substrate was conveyed to a protective-filmy-layer forming chamber 21'. The protective-filmy-layer forming chamber 21' is composed of ion guns consisting of a hot filament 22', an anode 23' and a grid 24' located in front of the hot filament. The protective-filmy-layer forming chamber 21' is also equipped with the shields against deposited particles 25' shown in FIG. 13, so as to have such a structure that a film is actively built up only outside a disc radius of 45.5 mm on the substrate and that build-up of a film is very difficult within a disc radius of 45.5 mm. From behind the anode, Ar gas and ethylene ($C_2H_4$) gas were introduced into the chamber 21', each at a rate of 15 sccm, through a mass flow controller while evacuating the protective-filmy-layer forming chamber 21' with a turbo molecular pump. In this case, the pressure was about 0.5 Pa (4 mTorr) as measured with a Baratron gauge.

Then, DC 1000 W was applied to graphite sintering targets fixed on cathodes located on both sides of the substrate, to induce plasma. In this case, the discharge current was about 1.5 A and the discharge voltage about 670 v. By this so-called reactive splluttering method, an amorphous carbon protective filmy layer 4' composed mainly of carbon and nitrogen and containing hydrogen was formed in a thickness of 6 nm on the Co—Cr—Ta—Pt alloy layer 3'. In this case, the build-up rate of the film was 0.8 nm/s.

Consequently, the protective filmy layers were combined as follows: a two-layer structure having a total thickness of 11 nm was formed of the amorphous carbon layer and the DLC layer outside a disc radius of 45.5 mm, and the amorphous carbon layer having a thickness of 6 nm was present alone within a disc radius of 45.5 mm. The thus treated substrate was taken out of the vacuum tank and allowed to cool to room temperature spontaneously.

A plurality of discs were produced in the manner described above. Some of them were used for analyzing their protective filmy layers. Some others were subjected to tape cleaning and then provided with a layer of about 2 nm thick of a fluorocarbon type lubricant, and after lifting check, they were subjected to a sliding test singly or subjected to a reliability test after being incorporated into a magnetic disc apparatus.

The total thickness of the protective filmy layers of the disc produced in the manner described above was measured with an ellipsometer at a 0.1-mm pitch from the ramp load area to the area other than the area where ramp load was carried out, i.e., the so-called data area here the protective film did not steadily come into contact with a magnetic head. As a result, it was found that the transient area where 90% of the thickness in the ramp load area, i.e., 9.9 nm, decreased to 110% of the thickness in the data area, i.e., 6.6 nm, had a length of 2.4 mm in the radial direction. Raman spectroscopic analysis was carried out in order to investigate the structures of the protective filmy layers of the disc produced in the manner described above. For the sake of simplicity, there were used a disc having no protective filmy layer 4' formed thereon and a disc having no protective filmy layer 5' formed thereon. There were employed Raman spectroscopic analysis apparatus 2010 manufactured by Lennie-Shaw Co., an Ar laser (514.5 nm), and a measuring wave number of 1000 to 1800, or 1000 to 2300/cm.

As a result, by the same fact as described in Embodiment 6, it could be confirmed that the protective filmy layer 5' was a typical DLC film as shown in FIG. 11. By the same fact as described in Embodiment 6, it could also be confirmed that the protective filmy layer 4' was an amorphous carbon layer containing both a large amount of nitrogen and hydrogen, as shown in FIG. 12.

On the other hand, ten of the discs also having the lubricant layer formed thereon were individually set in a ramp load evaluation apparatus and tested. When the 10 discs were subjected to ramp load 50,000 times at a revolution rate of 7,500 r.p.m., all of the 10 discs finished the test without crash. When their surfaces after the test were carefully observed under a microscope and carefully and visually observed by oblique light, no injury was detected in the discs. Thus, it was proved that the magnetic recording medium of the present invention has a sufficient reliability on resistance to sliding when the thickness of the protective film in the area where a magnetic head performs ramp load is 11 nm.

Next, 0.1 g of alumina particles having an average particle size of 0.1 μm were casted on each of the 10 discs while carrying out random seeking of a magnetic head at 7,500 r.p.m. in the area other than the area where ramp load was carried out, i.e., the so-called data area (corresponding to a disc radius range of 21 mm to 45.5 mm) where the protective film did not steadily come into contact with the magnetic head. After 120 seconds of the seeking, the disc surface was observed under a microscope and visually observed by oblique light. As a result, it was found that although the surface of the protective film had received some very slight scratches, so-called crash accompanying the fracture of the protective film had not occurred. Thus, it was proved that the magnetic recording medium of the present invention can have a sufficient reliability on resistance to sliding though the thickness of the protective filmy layer in the data area is as very small as 6 nm.

As explained above, Embodiments of the present invention include the following examples of constitutions.

A process for producing a magnetic recording medium comprising a substrate, a magnetic film formed thereon and a protective film formed thereon for the protection of said magnetic film and composed mainly of carbon, which comprises forming a filmy layer as a portion of said protective film where said protective film comes into contact with a magnetic head at the time of starting or standing of said magnetic head, by an ion beam method using either only a hydrocarbon gas or a combination of a hydrocarbon gas and at least one of Ne, Ar, Kr and Xe, and then forming another protective filmy layer capable of constituting substantially the whole surface of said magnetic recording medium, by a sputtering method using $N_2$ and at least one of $H_2$, Ne, Ar, Kr and Xe.

A process for producing a magnetic recording medium comprising a substrate, a magnetic film formed thereon and a protective film formed thereon for the protection of said magnetic film and composed mainly of carbon, which comprises forming a protective filmy layer capable of constituting substantially the whole surface of said magnetic recording medium, by a sputtering method using $N_2$ and at least one of $H_2$, Ne, Ar, Kr and Xe, and then forming another filmy layer thereon as a portion of said protective film where said protective film comes into contact with a magnetic head at the time of starting or standing of said magnetic head, by an ion beam method using either only a hydrocarbon gas or a combination of a hydro-carbon gas and at least one of Ne, Ar, Kr and Xe.

A magnetic recording medium comprising a substrate, a magnetic film formed thereon and a protective film formed thereon for the protection of said magnetic film and composed mainly of carbon, wherein a portion of said protective film where said protective film comes into contact with a magnetic head at the time of starting or standing of said magnetic head comprises a diamond-like (DLC) layer composed mainly of carbon and hydrogen and an amorphous carbon layer composed mainly of carbon and nitrogen and containing hydrogen, and the portion other than said contact portion of said protective film comprises an amorphous carbon layer composed mainly of carbon and nitrogen and containing hydrogen.

A magnetic recording medium comprising a substrate, a magnetic film formed thereon and a protective film formed thereon for the protection of said magnetic film and composed mainly of carbon, wherein the thickness of the other portion of said protective film than a portion where said protective film comes into contact with a magnetic head at the time of starting or standing of said magnetic head is 10 nm or less, the thickness of the portion of said protective film where said protective film comes into contact with a magnetic head at the time of starting or standing of said magnetic head is larger than that of the portion other than said contact portion of said protective film and is 20 nm or less, and the rate of thickness change in the radial direction of said protective film in the boundary between said contact portion of said protective film and the portion other than said contact portion of said protective film is higher than the rate of thickness change in the radial direction of said protective film in the portion other than said contact portion of said protective film and has a value of 1.0 nm/mm or more.

According to the present invention, it is possible to obtain a magnetic recording medium which permits high-density recording and has an excellent reliability, as a magnetic recording medium comprising a substrate, a magnetic film formed thereon and a protective film formed thereon for the protection of said magnetic and composed mainly of carbon, wherein a portion of said protective film where a magnetic head comes into contact with said protective film at the time of starting and/or standing of the magnetic head is composed mainly of carbon and nitrogen, the other portion is composed mainly of carbon, nitrogen and hydrogen, the hardness of the portion where a magnetic head comes into contact with said protective film at the time of starting and/or standing of the magnetic head is less than 19 Gpa and not less than 15 Gpa as measured in a definite-indentation-depth mode by using a Barkovich type diamond indenter, the hardness of the other portion of said protective film is 19 Gpa or more, and the thickness of the other portion of said protective film than the portion where a magnetic head comes into contact with said protective film at the time of starting and/or standing of the magnetic head is 15 nm or less.

Said protective film can be obtained by forming a film composed mainly of carbon, hydrogen and nitrogen, and hen laminating another film composed mainly of carbon and nitrogen on the film composed mainly of carbon, hydrogen and nitrogen, as the portion of the protective film where a magnetic head comes into contact with said protective film at the time of starting and/or standing of the magnetic head.

Said protective film can be formed by forming a film by a sputtering method using $H_2$ in addition to either only $N_2$ or a combination of $N_2$ and at least one of Ne, Ar, Kr and Xe, and forming another film thereon by a sputtering method using either only $N_2$ or a combination of $N_2$ and at least one of Ne, Ar, Kr and Xe, after taking a means for preventing the adhesion of sputtering particles in the other portion of the protective film than a portion where a magnetic head comes into contact with the protective film at the time of starting and/or standing of the magnetic head.

In addition, a magnetic disc apparatus having high capacity and reliability can be provided by combining said magnetic recording medium with a magnetic head.

Furthermore, according to the present invention, it is possible to obtain a process for producing a magnetic recording medium which permits high-density recording and has an excellent reliability, as a process for producing a magnetic recording medium comprising a substrate, a magnetic film formed thereon and a protective film formed thereon for the protection of said magnetic film and composed mainly of carbon, which comprises forming a filmy layer as a portion of said protective film where said protective film comes into contact with a magnetic head at the time of starting or standing of said magnetic head, by an ion beam method using either only a hydrocarbon gas or a combination of a hydrocarbon gas and at least one of Ne, Ar, Kr and Xe, and then forming another protective filmy layer capable of constituting substantially the whole surface of the abovementioned magnetic recording medium, by a sputtering method using $N_2$ and at least one of $H_2$, Ne, Ar, Kr and Xe; or which comprises forming a protective filmy layer capable of constituting substantially the whole surface of the abovementioned magnetic recording medium, by a sputtering method using $N_2$ and at least one of $H_2$, Ne, Ar, Kr and Xe, and then forming another filmy layer thereon as a portion of said protective film where said protective film comes into contact with a magnetic head at the time of starting or standing of said magnetic head, by an ion beam method using either only a hydrocarbon gas or a combination of a hydrocarbon gas and at least one of Ne, Ar, Kr and Xe.

Since the portion of said protective film where said protective film comes into contact with a magnetic head at the time of starting or standing of said magnetic head is formed by the ion beam method, the boundary portion between said contact portion and the other portion can be formed so as to have a steep curved surface. Therefore, the recording area can be efficiently extended.

What is claimed is:

1. A magnetic recording medium comprising:

a magnetic disk having a data zone and a CSS zone and including:
   a substrate, and
   a magnetic film formed on said substrate and a protective film formed thereon for the protection of said magnetic film and composed mainly of carbon, said protective film including a first portion overlying said CSS zone, and a second portion overlying said data zone, said first portion of said protective film being composed mainly of carbon and nitrogen and having a hardness of less than 19 Gpa and not less than 15 Gpa, and said second portion of said protective film being composed mainly of carbon, nitrogen and hydrogen and having a hardness of 19 Gpa or more.

2. A magnetic storage apparatus comprising a magnetic recording medium according to claim 1, and further including:

a driving unit for driving said magnetic recording medium, a magnetic head comprising a recording portion and a reproducing portion, the reproducing portion comprising a magnetoresistance effect element;

a record production signal processing unit capable of supplying signals to and receiving signals from said magnetic head.

* * * * *

UNITED STATES PATENT AND TRADEMARK OFFICE
CERTIFICATE OF CORRECTION

PATENT NO.    : 6,403,194 B1
DATED         : June 11, 2002
INVENTOR(S)   : Toshinori Ono et al.

It is certified that error appears in the above-identified patent and that said Letters Patent is hereby corrected as shown below:

Column 24,
Line 56, change "300" to -- 30º --.

Column 31,
Line 31, change "3.5 Am" to -- 3.5 $\mu m$ --.

Signed and Sealed this

Fifth Day of August, 2003

JAMES E. ROGAN
*Director of the United States Patent and Trademark Office*